US012075844B2

(12) United States Patent
Carlson et al.

(10) Patent No.: US 12,075,844 B2
(45) Date of Patent: Sep. 3, 2024

(54) APPARATUS FOR TESTING ELECTRONIC CIGARETTES

(71) Applicant: Research Triangle Institute, Research Triangle Park, NC (US)

(72) Inventors: James B. Carlson, Durham, NC (US); Jonathan W. Thornburg, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 309 days.

(21) Appl. No.: 17/669,759

(22) Filed: Feb. 11, 2022

(65) Prior Publication Data

US 2022/0160050 A1 May 26, 2022

Related U.S. Application Data

(63) Continuation of application No. PCT/US2020/045853, filed on Aug. 12, 2020.
(Continued)

(51) Int. Cl.
*G01K 7/02* (2021.01)
*A24F 40/80* (2020.01)
(Continued)

(52) U.S. Cl.
CPC ............. *A24F 40/80* (2020.01); *G01K 7/02* (2013.01); *H02J 7/0045* (2013.01); *A24F 40/10* (2020.01); *A24F 40/42* (2020.01)

(58) Field of Classification Search
None
See application file for complete search history.

(56) References Cited

U.S. PATENT DOCUMENTS

2018/0146711 A1* 5/2018 Mazur ............... A61M 15/0028
2019/0183185 A1* 6/2019 Manas .................... A24F 40/53

FOREIGN PATENT DOCUMENTS

CN 204536019 U 8/2015
CN 109007979 A 12/2018
(Continued)

OTHER PUBLICATIONS

ISA/KR; International Search Report and Written Opinion for International Patent Application No. PCT/US20/45853 dated Nov. 19, 2020, 14 pages.
(Continued)

*Primary Examiner* — Brandi N Hopkins
*Assistant Examiner* — Nigel H Plumb
(74) *Attorney, Agent, or Firm* — NK Patent Law

(57) ABSTRACT

Apparatus for testing an electronic smoking (e-smoking) device includes an electronic circuit for electronically activating an e-smoking device and causing the e-smoking device to generate a plurality of puffs by converting a wicking fluid therein into a plurality of puffs without a need for a human to physically contact the e-smoking device during puff generation, and a wireless controller for controlling the electronic circuit. The electronic circuit is configured for activating the e-smoking device to generate the plurality of puffs based on wireless signals received at the wireless controller. The apparatus is further configured for measuring a characteristic of the e-smoking device, which may include a rate of conversion of the wicking fluid to vapor as a function of time for the plurality of puffs.

20 Claims, 19 Drawing Sheets

Related U.S. Application Data

(60) Provisional application No. 62/888,789, filed on Aug. 19, 2019.

(51) Int. Cl.
    *H02J 7/00*     (2006.01)
    *A24F 40/10*     (2020.01)
    *A24F 40/42*     (2020.01)

(56) References Cited

FOREIGN PATENT DOCUMENTS

| CN | 109700074 A | 5/2019 |
| CN | 109820249 A | 5/2019 |

OTHER PUBLICATIONS

WIPO; International Preliminary Report on Patentability for International Patent Application No. PCT/US2020/045853 dated Mar. 3, 2022, 8 pages.

\* cited by examiner

| Date | Time | Event ▶ | Watts ▶ | Seconds ▶ | Weight Intial ▶ | Weight Real Time | Idle/ Active ▶ | Reservoir ▶ | Wick ▶ | Coil ▶ | Ambient ▶ | Air Flow |
|---|---|---|---|---|---|---|---|---|---|---|---|---|
| 3/14/2019 | 9:53:15 | 1 | 75 | 3 | 4.57 | 4.57 | — | 23 | 24 | 24.25 | 24 | 23 |
| 3/14/2019 | 9:53:16 | 2 | 75 | 3 | 4.57 | 4.57 | — | 23 | 24 | 24.25 | 24 | 23.25 |
| 3/14/2019 | 9:53:17 | 3 | 75 | 3 | 4.57 | 4.57 | — | 24 | 24 | 24 | 23 | 23.25 |
| 3/14/2019 | 9:53:18 | 4 | 75 | 3 | 4.57 | 4.57 | — | 23 | 24.25 | 24 | 23 | 23.25 |
| 3/14/2019 | 9:53:19 | 5 | 75 | 3 | 4.57 | 4.57 | — | 23 | 24.25 | 24.25 | 24 | 23.25 |
| 3/14/2019 | 9:53:20 | 6 | 75 | 3 | 4.57 | 4.57 | — | 23 | 24 | 24.25 | 24 | 23 |
| 3/14/2019 | 9:53:21 | 7 | 75 | 3 | 4.57 | 4.57 | — | 24 | 24 | 24.25 | 24 | 23.25 |

APPARATUS FOR TESTING ELECTRONIC CIGARETTES

CROSS-REFERENCE TO RELATED APPLICATIONS

This application is a continuation application of International Patent Application No. PCT/US20/45853 filed on Aug. 12, 2020, which claims priority to U.S. Provisional Patent Application 62/888,789 filed on Aug. 19, 2019, the entire contents of which are all hereby incorporated herein by reference.

STATEMENT OF FEDERALLY FUNDED RESEARCH

The present invention was made with United States Government support under contract numbers HHSF223201810047I and HHSF223201810194C awarded by the U.S. Food and Drug Administration. The United States Government has certain rights in the invention.

TECHNICAL FIELD

The present invention relates generally to the field of testing electronic devices, and more particularly, to a system and device for testing electronic smoking devices such as e-cigarettes.

BACKGROUND

Electronic smoking (e-smoking) devices such as electronic cigarettes, also known by other names such as e-cigarettes, e-vaporizers, and electronic nicotine delivery systems, are battery-operated devices that people use to inhale a vapor, which typically contains nicotine, flavorings, and other chemicals. When a user inhales a puff of the vapor from the e-cigarette, the vapor inhaled by the user is generated by the vaporization of a wicking fluid present within a fluid reservoir of the e-cigarette.

Tests are conducted to determine the wick rate of the wicking fluid of e-cigarettes. The test method for measuring the wicking rate of an e-cigarette typically employs a gravimetric measure of the change in mass of the wicking liquid during each of a series of puffs, and evaluating the rate of change of mass data to identify whenever there is a change in the slope of the rate of change plot. To facilitate this, the e-cigarette needs to be activated by pressing the appropriate activating button by applying physical pressure to the activating button, while the e-cigarette is placed on a scale and instrumented with thermal couples. Likewise, temperature data needs to be captured from the ambience of the e-cigarette during a series of puffs, and the captured temperature data retrieved in real time for display on a computing device. However, physical interaction with the e-cigarette device by a user that is required for activating the device and for facilitating capture of the data related to the mass of the wicking liquid and the temperature modulation associated with the plurality of puffs can affect the data being taken.

Opportunities exist for improved methods for collecting data of improved quality during the testing of e-smoking devices such as e-cigarettes.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is an apparatus for testing an electronic smoking (e-smoking) device. In various embodiment, the apparatus includes an electronic circuit for electronically activating an e-smoking device for converting a wicking fluid therein into a plurality of puffs; a wireless controller for controlling the electronic circuit. The electronic circuit is configured for activating the e-smoking device based on wireless signals received at the wireless controller. The apparatus is configured for measuring a characteristic of the e-smoking device, wherein, optionally, the characteristic is a rate of conversion of the wicking fluid to vapor as a function of time for the plurality of puffs.

In one or more embodiments, the apparatus further comprises at least five thermocouples protruding through the top surface of the housing of the apparatus, a first thermocouple configured for measuring a reservoir temperature, a second thermocouple configured for measuring a wick temperature, a third thermocouple configured for measuring a coil temperature, a fourth thermocouple configured for measuring an ambient temperature, and a fifth thermocouple configured for measuring an air stream flow temperature.

Disclosed herein is a method of testing an electronic smoking (e-smoking) device. The method comprises: providing an apparatus, the apparatus comprising an electronic circuit for electronically activating an e-smoking device for converting a wicking fluid therein into a plurality of puffs, and a wireless controller for controlling the electronic circuit; receiving, by the apparatus, a wireless signal at the wireless controller; activating, by the apparatus, an e-smoking device based on the received wireless signal; and measuring, by the apparatus, a characteristic of the e-smoking device, wherein, optionally, the characteristic is a rate of conversion of the wicking fluid to vapor as a function of time for the plurality of puffs.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 11 is a schematic representation illustrating a data display of an application associated with an e-cigarette testing apparatus, according to one or more embodiments of the presently disclosed subject matter.

DETAILED DESCRIPTION OF EMBODIMENTS

Figure 1:
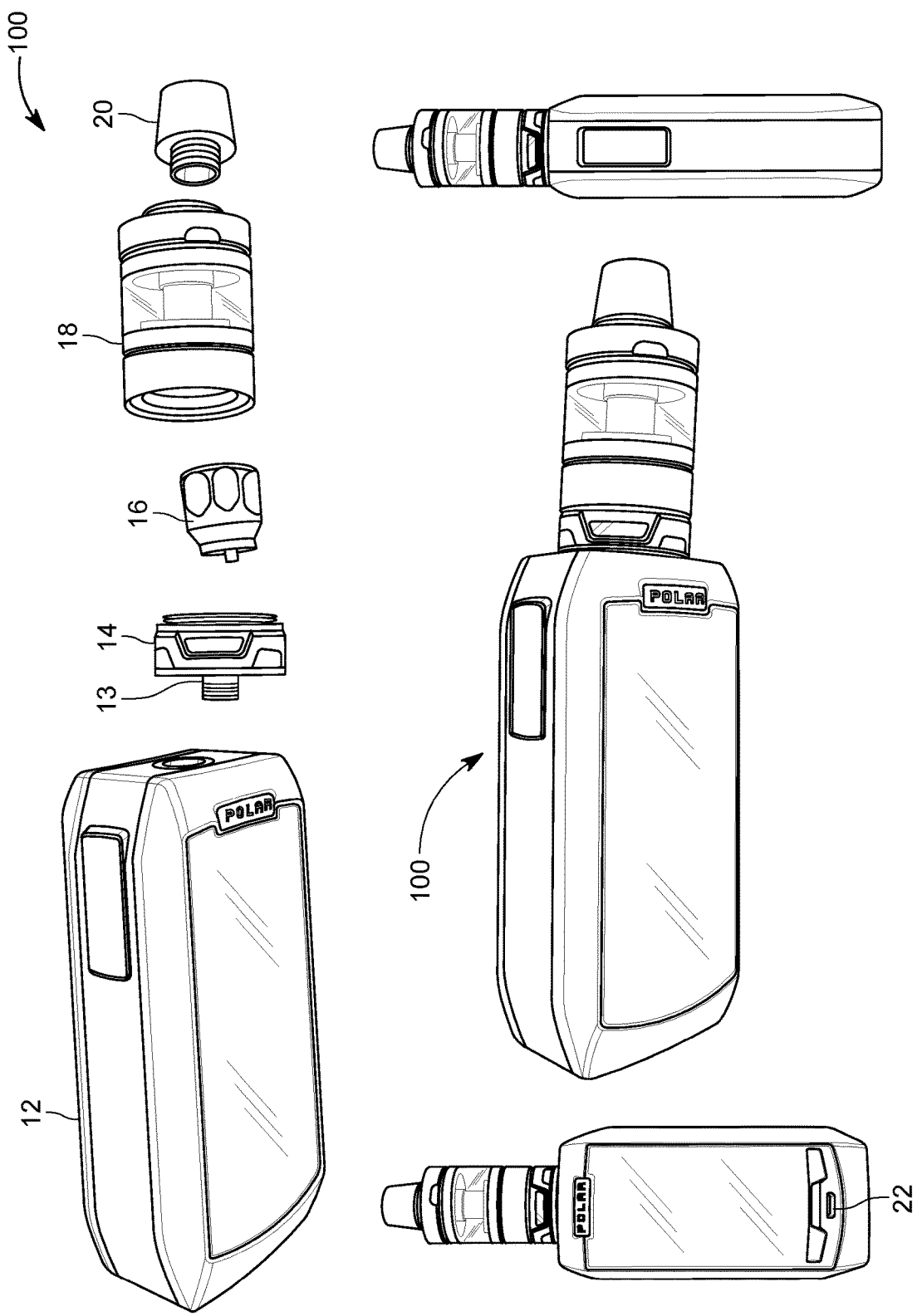
FIG. 1 is a schematic representation illustrating details of an e-smoking device, according to one or more embodiments of the presently disclosed subject matter.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

A typical e-cigarette device includes buttons that needed to be pressed for activating various functions of the device. Use of mechanical actuators can generate dynamic loads that can disturb the measurements being made during the actuation and testing of the device. Embodiments of the presently disclosed subject matter can advantageously overcome challenges associated with activating an e-cigarette device on a scale coupled to a testing apparatus without physically touching the activating buttons.

Test methods for measuring the wicking rate can employ a gravimetric measure of the change in mass of the wicking liquid for a puff, evaluating the rate change looking for when there is a change in the slope. By contrast, rather than simply measuring the starting and ending mass of the wicking liquid to calculate an average wicking rate, embodiments of the presently disclosed subject matter can advantageously measure the wicking rate as a function of time for each puff. This can advantageously allow for capturing changes in wicking rate due to the wicking liquid volume, tank fill level, and effects of wick aging or drying.

In addition to the activation of the e-cigarette device for conducting the test, a "draw" or simulated inhalation of the vapor produced is required. An external pump is typically provided to simulate such inhalations; however, attaching an external pump can interfere with the measurements taken at the scale. Alternately, adding a pump on the scale may not be adequate as the vapor could clog the pump or could otherwise remain on the scale, both yielding an improper measurement of the change in mass. To overcome this challenge, embodiments of the presently disclosed subject matter include a pump that, instead of providing a "draw" from the e-cigarette device, pushes an equivalent flow through the e-cigarette device insuring the plumb of smoke (i.e., the puff) is sent away from the e-cigarette device and the scale. Embodiments disclosed herein further include a battery sized for a complete performance of the test matrix.

Disclosed herein are embodiments corresponding to an apparatus for testing an electronic smoking (e-smoking) device such as an e-cigarette, for example, and controlling the operations of the e-cigarette device via a wireless controller. A wireless controller according to various embodiments of the presently disclosed subject matter can advantageously allow a researcher or user to configure and control an e-cigarette device in a wireless setting without having to physically touch the e-cigarette device or the testing apparatus used for testing the e-cigarette device during the course of the testing. Embodiments disclosed herein can accordingly advantageously improve the quality of the tests performed while simultaneously reducing the need for attention to detail by the user or researcher performing or monitoring the tests. Embodiments disclosed herein can allow for a battery operated, wirelessly controlled testing apparatus that pushes air through the e-cigarette device under test via a pump. Embodiments disclosed herein can allow a user such as a researcher, for example, to activate a e-cigarette device under test through a wireless interface in instances where touching the e-cigarette device being tested or the testing apparatus during the testing process can affect the quality of the test results. Embodiments of the presently disclosed subject can also be advantageously used in activating an e-cigarette device positioned such that external touching is not possible.

Embodiments disclosed herein allow for activation of the e-cigarette device while the e-cigarette device is on a scale without touching the device and permit receipt of test data from the e-cigarette device instrumented with thermal couples. Temperature data captured from the device during a puff can accordingly be retrieved in real time for display on a computing device such as, for example, a personal computer. Embodiments disclosed herein advantageously provide a wireless interface, for e.g., a Wi-Fi interface, that allows for control of the e-cigarette device under test from the computing device via a wireless controller and a wireless transceiver. Accordingly, in various embodiments, a wireless interface can couple the wireless controller to the electronic circuit.

Embodiments disclosed herein include an embedded system that encompasses an e-cigarette controller while replacing the mechanical button press actuations with electronic presses that can hold an activation step for a prescribed amount of time in a manner that is benign of dynamic forces, with the electronic presses being repeatable and measurable. The embedded system includes an embedded electronic circuit for electronically activating the e-cigarette device (or any other type of e-smoking device) to convert a wicking fluid therein into a plurality of puffs. The embedded system also includes a wireless controller for controlling the electronic circuit. The embedded electronic circuit is configured for activating the e-smoking device based on wireless signals received at the wireless controller.

Embodiments disclosed herein include a testing apparatus configured for measuring a characteristic of the e-smoking device. In one embodiment, the characteristic is a rate of conversion of the wicking fluid to vapor as a function of time for the plurality of puffs. In one embodiment, the characteristic is associated with one or more of an input supplied to the e-smoking device and an output from the e-smoking device.

The embedded system of the testing apparatus includes a wireless interface and permits commands to be sent to activate the buttons wirelessly. In addition to the activation of the buttons, embodiments of the presently disclosed subject matter can allow for temperature data associated with the coil, wick, reservoir and ambient air to be collected and transmitted by the embedded system. Whereas typical testing devices can include thermal couples that hang off the scale thereby disturbing test readings, the embedded system of the testing apparatus as described herein can advantageously allow for thermal couple readings to collected by the embedded system and communicated wirelessly to the computing device.

Embodiments disclosed herein can use the data taken from the thermocouples in real time to modify the test actuations and test times in real time to improve testing accuracy and uniformity.

Embodiments disclosed herein can also be used in other applications such as testing devices configured for controlled release of medical drugs where activation is needed remotely like inhalers, aroma therapy devices, and similar other devices. Embodiments disclosed herein can also be used in other applications such as testing devices in environments or in setups whereby the activation location of the device is not easily accessible by a person. Embodiments disclosed herein can be advantageously used in any application that requires a remote release of a controlled substance. Embodiments disclosed herein can also be advantageously used in any application that requires a remote release of a controlled substance where temperature is a factor that needs to monitored or controlled.

Figure 2:
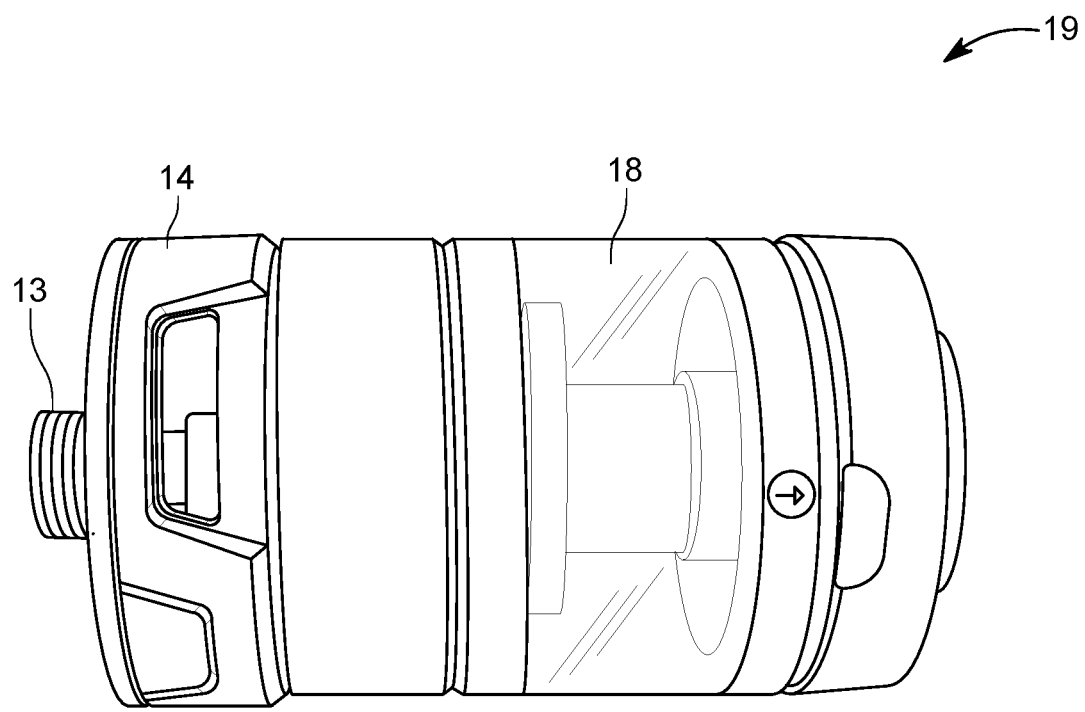
FIG. 2 is a schematic representation illustrating a cartridge that forms part of an e-smoking device, according to one or more embodiments of the presently disclosed subject matter.
Figure 3:
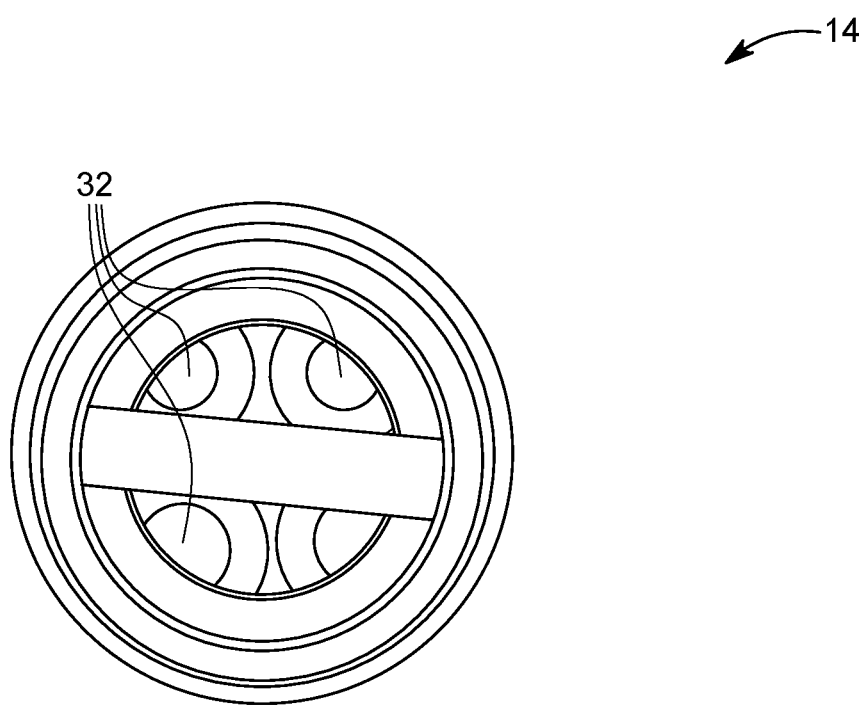
FIG. 3 is a schematic representation illustrating a heating coil provided within an air intake component of an e-smoking device, according to one or more embodiments of the presently disclosed subject matter.
Figure 4:
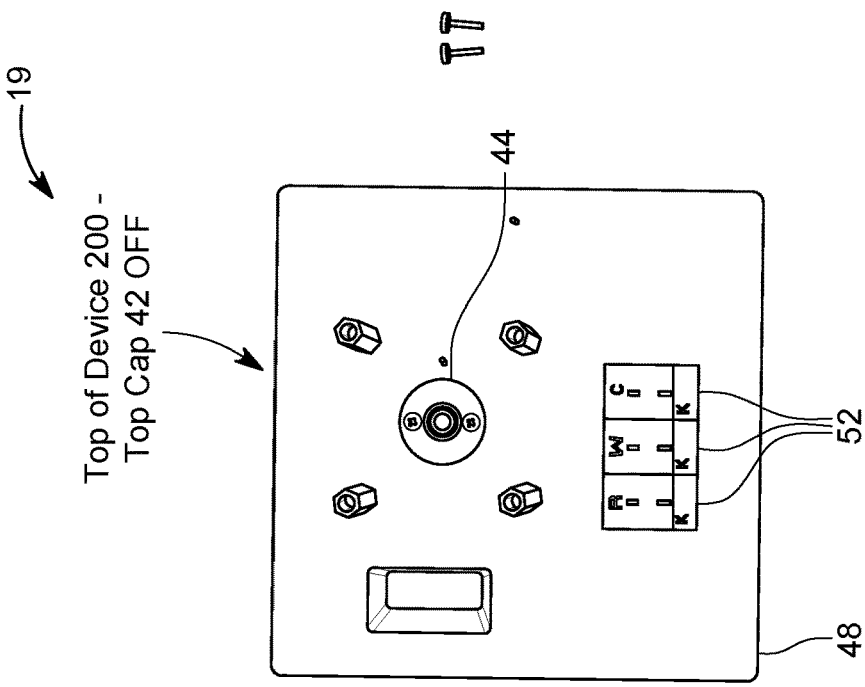
FIG. 4 is a schematic representation illustrating views of an e-cigarette testing apparatus; the left side figure illustrates a top cap positioned on a top surface of a housing forming part of the e-cigarette testing apparatus; the middle figure illustrates an underside of top cap; and, the right side figure illustrates a top surface of the housing with the top cap removed, according to one or more embodiments of the presently disclosed subject matter.
Figure 4:
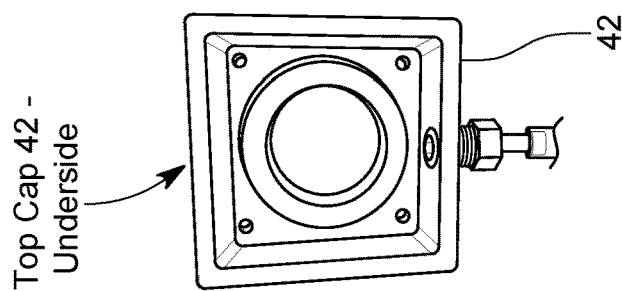
Figure 4:
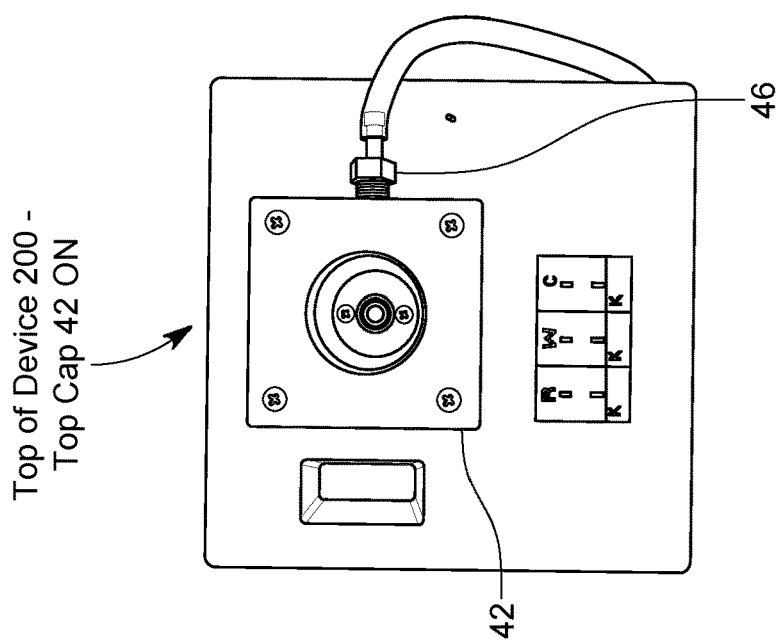

FIG. 1 illustrates an e-smoking device 100 (also referred to herein as "device 100" or simply "device") to be tested by an e-cigarette testing apparatus such as e-cigarette testing apparatus 200 (alternately referred to herein as "apparatus 200" or simply "apparatus") shown, for example, in FIG. 4. As shown in FIG. 1, e-smoking device 100 includes main body 12, power connector 13, air inlet 14, wick 16, fluid reservoir 18, mouth piece 20, and USB (Universal Serial Bus) port 22. In various embodiments, e-smoking device 100 can be any electronic smoking (e-smoking) device. FIG. 2 illustrates cartridge 19 that forms a top portion of e-cigarette device including power connector 13, air inlet 14, wick 16 (not visible in FIG. 2), fluid reservoir 18 that contains the liquid for vaporization. Power connector 13 connects to a cooperating power connector found on apparatus 200. FIG. 2 embodiment illustrates the main component of the e-smoking device 100 to be tested; accordingly, the term "e-cigarette device" as used herein can alternately refer to cartridge 19 (as shown in FIG. 2) that mounts on apparatus 200 for testing purposes; power connector 13 of cartridge 19 attaches to connector 44 (see FIG. 4) of apparatus 200; cartridge 19 can optionally include mouth piece 20 illustrated in FIG. 1. FIG. 3 illustrates heating coils 32 provided within air inlet 14 to facilitate wicking of the wicking fluid to vapor. The heating coils operate to vaporize the wicking fluid present in fluid reservoir 18. Power connector 13 operates to supply power to heat the heating coils. In one embodiment, one end of power connector 13 connects through the embedded system 77 to a battery such as battery 79 (see FIG. 8) while the other end of power connector 13 connects to one or more heating coils whereby the heating coils can vaporize the wicking fluid present in fluid reservoir 18.

Power connector 13 is positioned at a top surface of a housing of apparatus 200 for receiving a power connector of the e-smoking device. In various embodiments, power connector 13 is positioned at a top surface of a housing of the apparatus for receiving the power connector of the e-smoking device. The e-cigarette cartridge's air inlet will be close to the power connector. Accordingly, in various embodiments, the seal must be above the air inlet whereby it generally makes contact on the liquid chamber.

FIG. 4 illustrates top views of the e-cigarette testing apparatus 200 and a bottom view of top cap 42 according to one or more embodiments of the presently disclosed subject matter. The left side figure shows top cap 42 positioned on a top surface of housing 48 of apparatus 200. Top cap 42 is configured for receiving the e-smoking device, with top cap 42 configured for forming an airtight seal with the liquid reservoir. The left side figure further shows air inlet 46 provided for supplying air to air inlet 14 of e-smoking device 100 being tested. The middle figure shows an underside of top cap 42. The right side figure shows the top cap 42 removed; as shown in this figure, e-cigarette testing apparatus 200 comprises a connector 44 positioned at a top surface of housing 48 of the apparatus 200, wherein connector 44 is configured for receiving power connector 13 of the FIG. 2 embodiment of the e-smoking device under test. In one embodiment, connector 44 is configured to provide power controlled through a control circuit to a power receptor of the e-cigarette device to be tested. Accordingly, in various embodiments, top cap 42 is positioned on the top surface of the housing of apparatus 200 for sealing against the e-cigarette cartridge of the e-smoking device, with top cap 42 forming an airtight seal with the e-cigarette cartridge above the end of the air inlet of the e-smoking device. In one embodiment, connector 44 represents a sending power couple.

Figure 5:
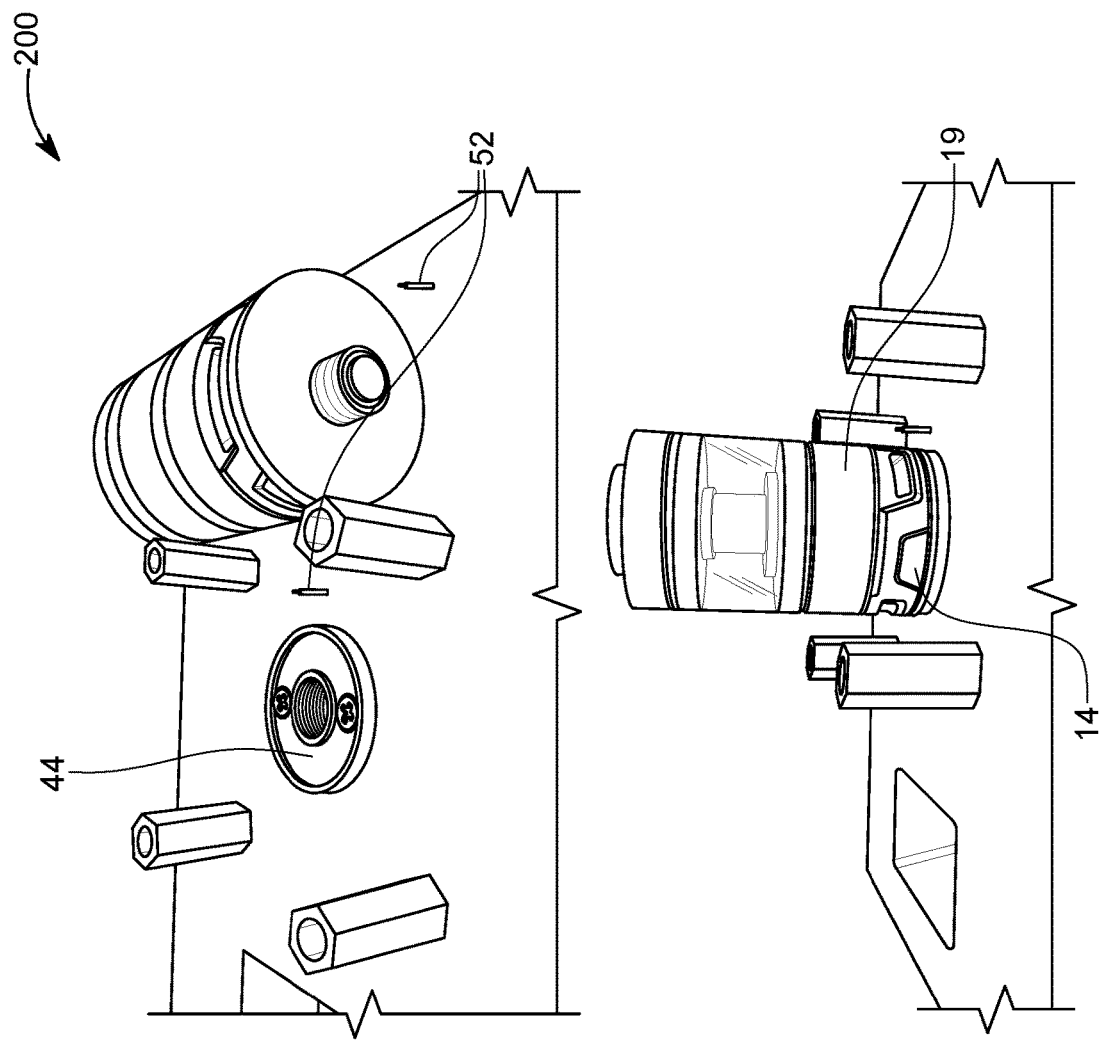
FIG. 5 is a schematic representation illustrating top views and top perspective views of an e-cigarette testing apparatus with a cartridge, according to one or more embodiments of the presently disclosed subject matter.
Figure 5:
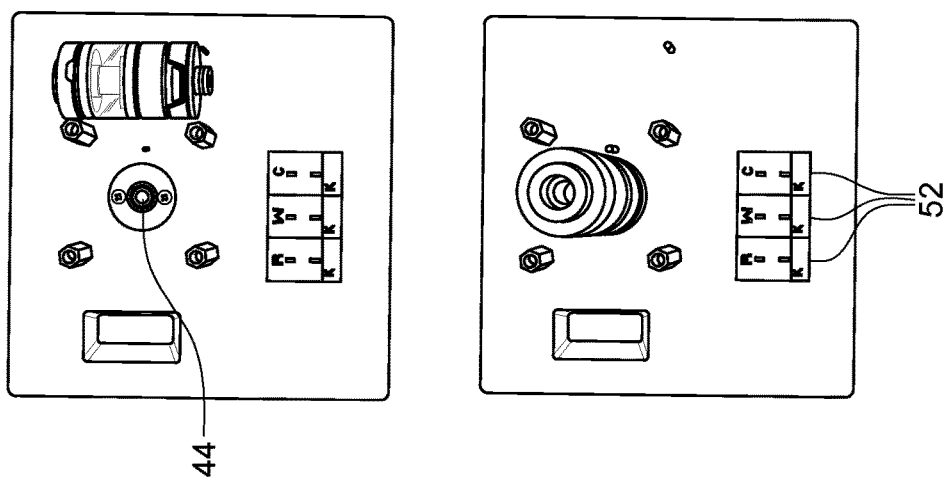

FIG. 5 illustrates top and top perspective views of the e-cigarette testing apparatus 200 and cartridge 19 according to one or more embodiments of the presently disclosed subject matter. In one embodiment, connector 44 is positioned at a top surface of housing 48 of the apparatus for receiving power connector 13 of cartridge 19. In one embodiment, connector 44 is a standardized 510 connector (as recognized by a person of skill in the art) that provides an interface between apparatus 200 and cartridge 19. Accordingly, in various embodiments, apparatus 200 further comprises a power connector positioned at a top surface of a housing of the apparatus for receiving an e-cigarette cartridge of the e-smoking device. In at least one embodiment, the cartridge can include an air inlet side, a reservoir, and an outlet.

Apparatus 200 can further include at least five thermocouples 52 present at or near the top surface of the housing 48 of apparatus 200 provided as follows: a first thermocouple configured for measuring a reservoir temperature, a second thermocouple configured for measuring a wick temperature, a third thermocouple configured for measuring a coil temperature, a fourth thermocouple configured for measuring an ambient temperature, and a fifth thermocouple configured for measuring an air stream flow temperature.

In embodiment, the first, second and third thermocouples include a quick disconnect mechanism. In one embodiment, both fourth thermocouple 52 and fifth thermocouple 52 protrude through the top surface of housing 48 of the apparatus. As shown in the Figure, one of the fourth and fifth thermocouples is positioned within an area covered by the top cap (for measuring the ambient air temperature as it enters air inlet 14 of cartridge 19 whereas the other is positioned outside of the area covered by the top cap. During the testing process, in case, the air inlet 14 includes options for several opening levels, the opening level of the air inlet 14 must be moved to a desired position allowing for airflow into cartridge 19 for proper testing of the e-smoking device 100. In some embodiments, apparatus 200 further includes one or more sensors to measure and track various parameters (e.g., temperature, resistance, supply voltage, amperage, etc.) associated with heating coils 32.

Figure 6:
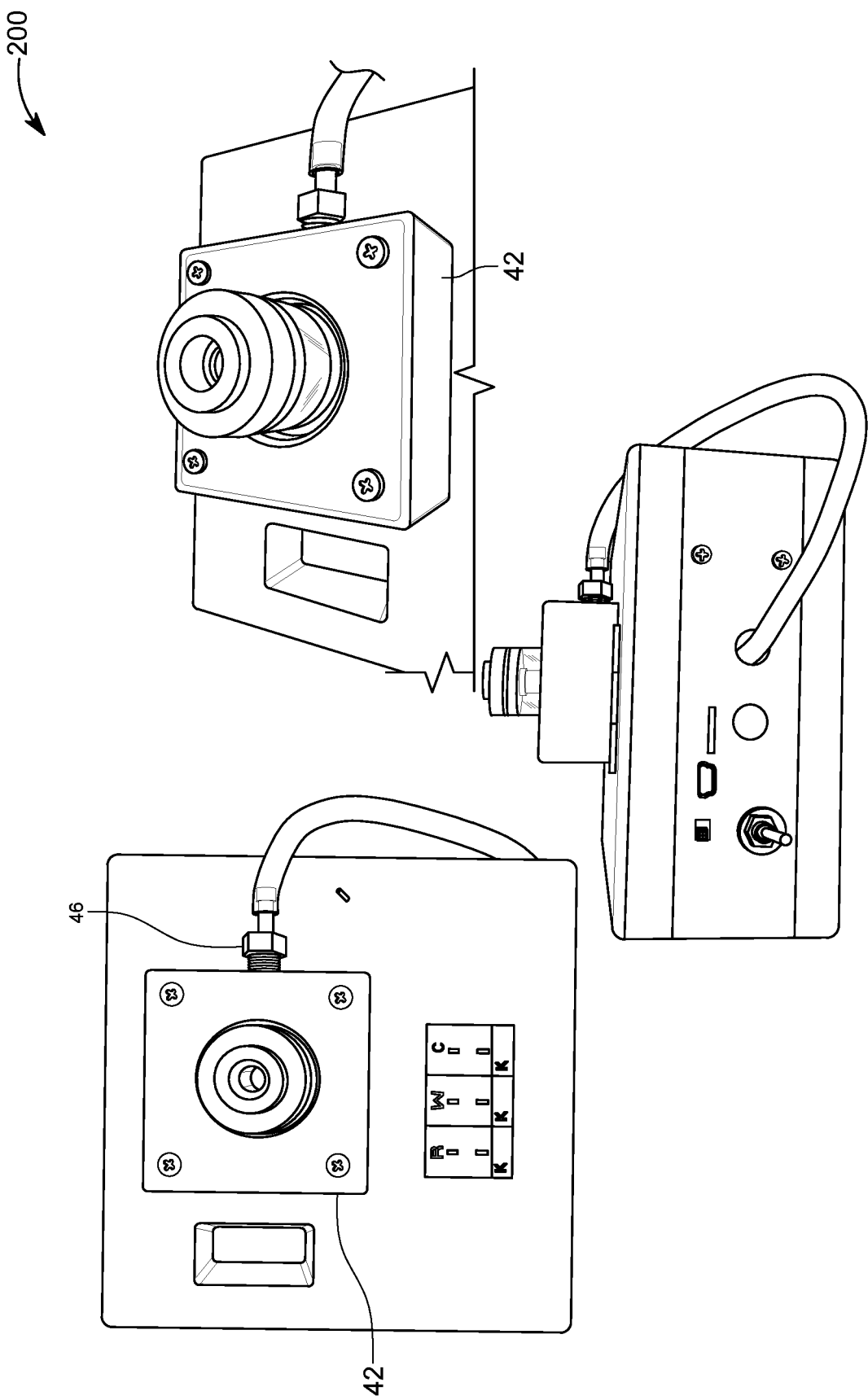
FIG. 6 is a schematic representation illustrating a top view, a top perspective view, and a side view of an e-cigarette testing apparatus with a cartridge, according to one or more embodiments of the presently disclosed subject matter.

FIG. 6 illustrates top, top perspective, and side views of the e-cigarette testing apparatus 200 with cartridge 19 according to one or more embodiments of the presently disclosed subject matter. In FIG. 6, top cap 42 is placed on the top surface of housing 48 and screwed therein. Apparatus 200 further is sized to receive and accommodate a highly accurate scale. In some embodiments, the scale forms an integral part of apparatus 200; in other words, in some embodiments, the scale is integrated with apparatus 200. Top cap 42 is interchangeable to fit the size of the fluid reservoir 18 of cartridge 19 to create a substantially airtight seal. Different spacers and top caps can be used to correct height and diameters associated with various liquid reservoir sizes to ensure a proper seal. FIG. 6 further illustrates an air inlet 46 for pushing air through the cartridge 19 for generating the plurality of puffs. Apparatus 200 includes a pump such as pump 94 (see FIG. 16) for pushing air through air inlet 46. In some embodiments, air inlet 46 includes an inlet filter such as inlet air filter 306 (see FIG. 16). inlet air filter 306 operates to filter before it flows through, and gets pumped by, pump 94. In one embodiment, inlet air filter 306 is accommodated within an opening on the outer surface of the housing. Air supply inlet 46 is in fluid communication with a conduit that supplies air to air inlet 14 of cartridge 19 of e-smoking device 100 being tested to facilitate the conversion of the wicking fluid in fluid reservoir 18 to vapor. Battery 79 (see FIG. 7) can supply power to the pump for pushing air through air inlet 46 and subsequently through air inlet 14 of cartridge 19 of e-smoking device 100 under test. Instead of providing a "draw" from the e-smoking device 100, the pump is configured to push an equivalent flow through the e-smoking device 100 insuring the plume of smoke (i.e., the puff) is sent away from the e-smoking device and the scale. The pump is thus configured for pushing air through e-smoking device 100 for generating the plurality of puffs. Electronic controls of apparatus 200 can configure the flow rate of pump 94 to simulate inhalations of different individuals. Accordingly, in various embodiments, apparatus 200 includes controls for setting and adjusting a flow rate of pump 94.

In some embodiments, apparatus 200 can include a power management module for managing and optimizing the power supplied by battery 79. The power management module can include an intelligent algorithm that monitors power usage and operates to lower or eliminate power usage of various components of apparatus 200 (i.e., optimize power usage) while simultaneously not compromising on the overall needs of the testing process that is underway.

In various embodiments, apparatus 200 can further include a memory for storing data. In one embodiment, the memory can be in the form of a removable SD card that is addressable by the electronic circuit for storing and recovering data. In some embodiments, the memory can be permanently built into the apparatus. The on-board memory can advantageously allow for storing data at the apparatus when a Wi-Fi connection is not available, for example. This can advantageously allow for storing data at the apparatus when testing a e-smoking device in the field whereby the collected data cannot be directly be transmitted to a central server or a computing device for storage.

Figure 7:
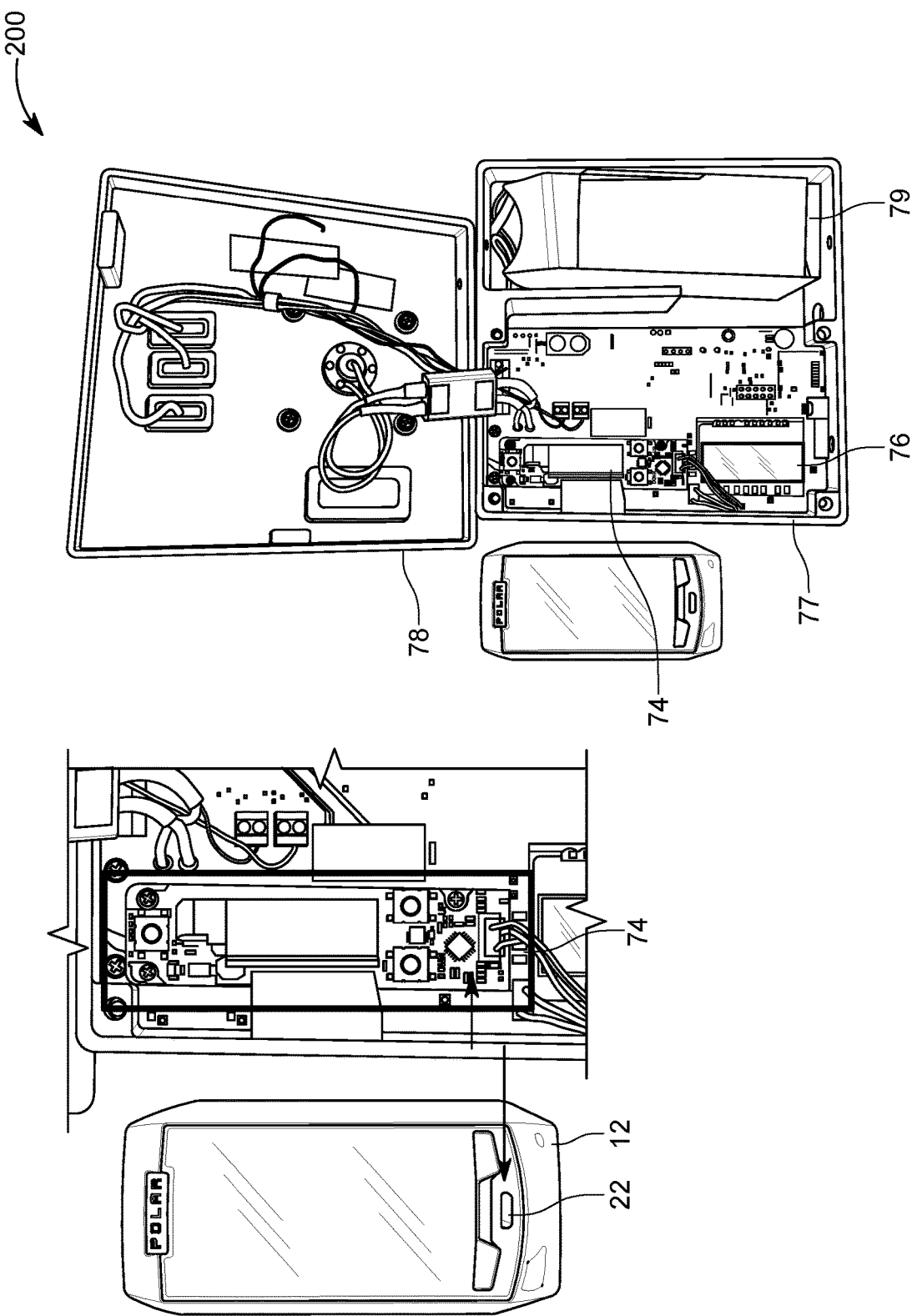
FIG. 7 is a schematic representation illustrating a top view of a main body of an e-smoking device and a e-cigarette control board (on the left side), and a top view of an e-cigarette testing apparatus with its cover opened up (on the right side), according to one or more embodiments of the presently disclosed subject matter.

The left side figure of FIG. 7 illustrates top view of main body 12 of e-smoking device 100, and a e-cigarette control board 74 similar to those present within the main body 12 of e-smoking device 100, according to one or more embodiments of the presently disclosed subject matter. In the left figure, e-cigarette control board 74 board present within housing 48 of apparatus 200 is shown oriented to align with the USB port 22 on the main body 12 of e-smoking device 100. E-cigarette control board 74 that provides the "brain" for e-smoking device 100 can form part of embedded system 77. The right-side figure of FIG. 7 illustrates a top view of the e-cigarette testing apparatus 200 with apparatus cover 78 removed, according to one or more embodiments of the presently disclosed subject matter. As shown on the right side of FIG. 7, apparatus 200 can include e-cigarette control board 74 integrated therein. In one embodiment, e-cigarette control board 74 can be a DNA250 e-cig control board. Embedded system 77 thus includes e-cigarette control board 74 integrated therein; embedded system 77 further includes electronic circuit 82 (see FIG. 8), and test device screen 76. Apparatus 200 also includes battery 79. FIG. 7 shows a backside of embedded system 77. Embedded system 77 can accordingly include all functionalities of e-cigarette control board 74; in one embodiment, embedded system 77 physically includes the whole of e-cigarette control board 74.

Figure 8:
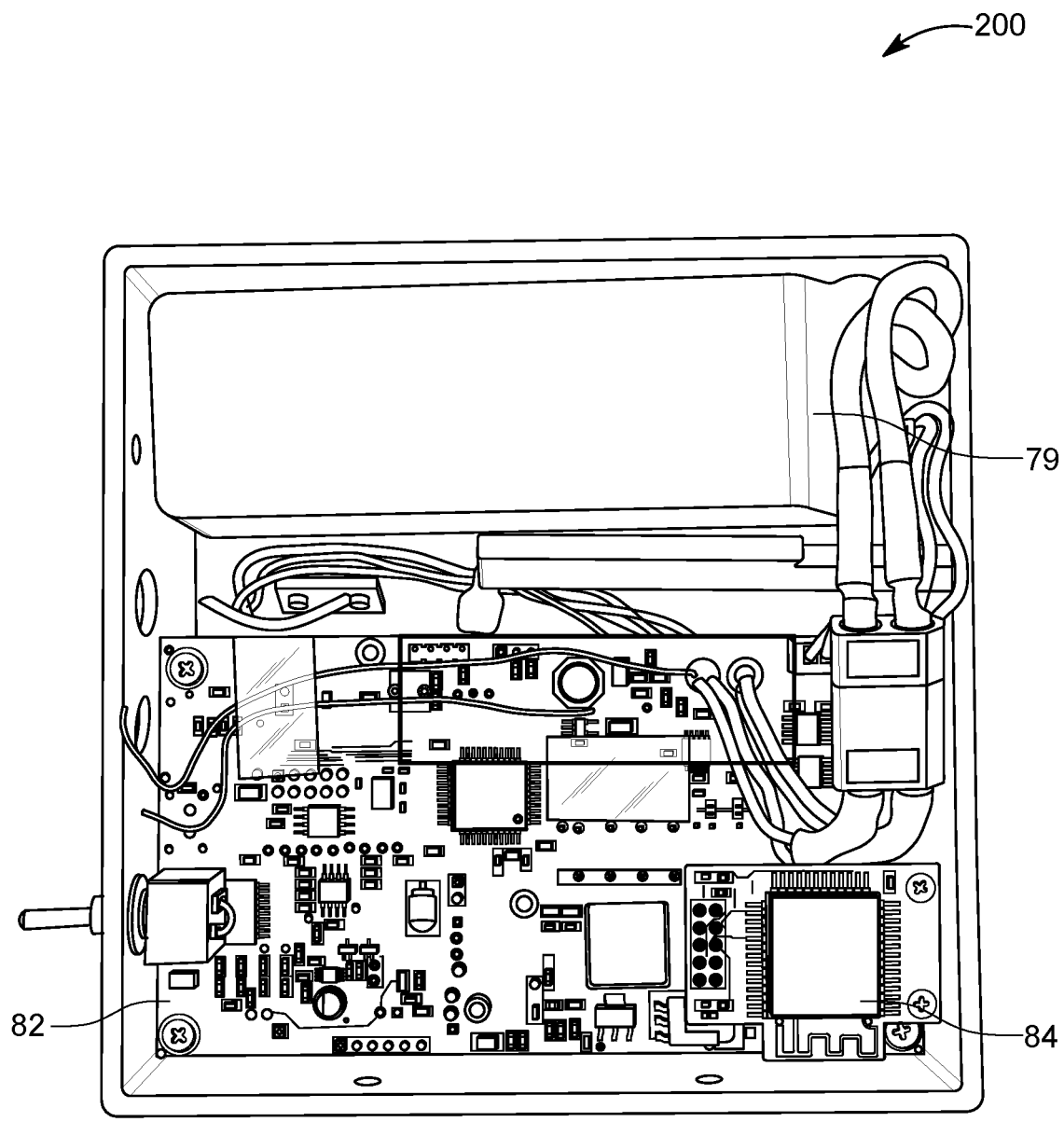
FIG. 8 is a schematic representation illustrating a bottom view of an e-cigarette testing apparatus, according to one or more embodiments of the presently disclosed subject matter.

FIG. 8 illustrates a bottom view of the e-cigarette testing apparatus 200 according to one or more embodiments of the presently disclosed subject matter. FIG. 8 shows a front side of embedded system 77 (embedded system 77 is labeled in FIG. 7). As shown in FIG. 7 and FIG. 8, embedded system 77 includes electronic circuit 82 and wireless controller 84. In one embodiment, wireless controller 84 includes a wireless circuit. In one embodiment, a wireless interface couples wireless controller 84 to electronic circuit 82 of embedded system 77. In one embodiment, embedded system 77 can include the whole of e-cigarette control board 74 (e-cigarette control board 74 is labeled in FIG. 7), whereby e-cigarette control board 74 can be fully enclosed within housing 48 of apparatus 200. In FIG. 8, a pump and pump controls that form part of apparatus 200 have been removed for ease of illustration. The pump is typically positioned at an approximate center of housing 48 of apparatus 200, with the pump control connecting near the front of device.

Embodiments of the presently disclosed subject matter accordingly provide apparatus 200 that is configured for electronic circuit 82 of the embedded system 77 to activate e-smoking device 100 and otherwise control and monitor the operations of e-smoking device 100 without the need for a human to physically contact e-smoking device 100 during the course of the testing phase. In various embodiments, electronic circuit 82 is configured for activating different functions of the e-smoking device based on signals received at wireless controller 84. The different functions can comprise one or more of: a power adjustment, a puff activation period, setting a time interval between puff activations, and setting a predetermined number of puff generations.

In one embodiment, electronic circuit 82 is configured for activating different functions of the e-smoking device based on real time analysis of test results and transferring the results back via the wireless controller 84 for display on a graphical user interface (GUI) of a computing device. In at least one embodiment, a wired controller can be used instead of wireless controller 84, with this wired controller otherwise sharing all other characteristics of wireless controller 84. In various embodiments, electronic circuit 82 is configured to include a feedback loop to modify a testing sequence of the e-smoking device in real time based on data captured at the apparatus.

In one embodiment, at least one display screen positioned at or near a top surface of housing 48 such that the display screen is visible through a transparent window provided at the top surface of housing 48. In another embodiment, at least one display screen can be coupled to the top surface of housing 48.

In some embodiments, apparatus 200 can include an outlet or an exhaust nozzle for exhausting the vapor generated at e-smoking device 100. In some embodiments, the outlet is the mouthpiece of the cartridge; in one embodiment, the outlet can be in the form of a hood.

In one embodiment, apparatus 200 includes a scale for measuring a change in mass associated with the conversion of the wicking fluid to vapor. In various embodiments, apparatus 200 is configured for collecting temperature data associated with each of the plurality of puffs for display on a graphical user interface (GUI) of a computing device. In various embodiments, electronic circuit 82 is configured to communicate data associated with the conversion of the wicking fluid to vapor to the wireless controller; the wireless controller in turn may communicate this data to the computing device via a wireless connection thereto. The electronic circuit as disclosed herein is thus configured to communicate data associated with conversion of the wicking fluid to vapor to the wireless controller. The electronic circuit as disclosed herein can further include a feedback loop to modify a testing sequence of the e-smoking device in real time based on data captured at the apparatus.

In some embodiments, the test method for measuring the wicking rate employs a gravimetric measure of the change in mass of the e-liquid for a puff, evaluating the rate change in real time looking for when there is a change in the slope. Rather than simply measuring the starting and ending mass of the e-liquid to calculate an average wicking rate, this method measures the wicking rate as a function of time for each puff. This allows capturing changes in wicking rate due to e-liquid volume, tank fill level, and effects of wick aging or drying.

In some embodiments, apparatus 200 is configured to detect, measure and/or capture data on additional physical characteristics associated with one or more compounds or materials present in the plurality of puffs (collectively referred to herein "additional e-cigarette puff content data"). Apparatus 200 can make this additional e-cigarette puff content data available for display on a graphical user interface (GUI) of a computing device. Accordingly, the additional e-cigarette puff content data may be collected by apparatus 200, in addition to data related to mass and temperature. In various embodiments, electronic circuit 82 is configured to communicate the additional e-cigarette puff content data associated with the conversion of the wicking fluid to vapor to the wireless controller. The wireless controller in turn may communicate this additional e-cigarette puff content data to the computing device via a wireless connection thereto. According to at least one embodiment, apparatus 200 is thus configured for displaying the collected data on a graphical user interface (GUI) of a computing device; apparatus 200 is also configured for communicating data associated with conversion of the wicking fluid to vapor to the wireless controller.

In various embodiments, the additional e-cigarette puff content data can include information on the quality and/or quantity of one or more of the following byproducts resulting from the conversion of the wicking fluid to vapor: carbon dioxide, water, carbon monoxide, particulate matter, tar, nicotine, propylene glycol, glycerin, nitrogen oxides, hydrogen cyanide, ammonia, formaldehyde, phenol, volatile organic compounds (VOC), heavy metals such as nickel, tin, and lead, ultrafine particles, flavoring chemicals such as diacetyl, and other toxic compounds. In various embodiments, apparatus 200 can include appropriate sensors and other measuring devices and mechanisms to detect, measure and/or capture the additional e-cigarette puff content data. Accordingly, in various embodiments, apparatus 200 further comprises a plurality of sensor for performing functions such as sensing/detecting presence of a compound or a material existing in the plurality of puffs, and/or measuring a quantify of the compound or the material present in the plurality of puffs. Stated differently, the characteristic of the e-smoking device measured by apparatus 200 can include presence of a compound or a material in the plurality of puffs a well as a quantify of the compound or the material present in the plurality of puffs, with the compound or material representing items such as carbon dioxide, water, carbon monoxide, particulate matter, tar, nicotine, propylene glycol, glycerin, nitrogen oxides, hydrogen cyanide, ammonia, formaldehyde, phenol, volatile organic compounds (VOC), heavy metals such as nickel, tin, and lead, ultrafine particles, flavoring chemicals such as diacetyl, and/or other toxic compounds.

In some embodiments, the exhaust nozzle of apparatus 200 can have specific angle in relation to a major transverse plane of apparatus 200. Accordingly, apparatus 200 can include several angular settings of the apparatus for testing the e-smoking device at different angles of an exhaust nozzle of the apparatus relative to a transverse major plane of apparatus 200. For example, in various embodiments, the exhaust nozzle of apparatus 200 can make a 15°, 30°, 45°, 60°, 75°, 90°, 105°, 120°, 135°, 150°, 165°, 180°, or a similar other angle in relation to a major transverse plane of apparatus 200. In some embodiments, the powered port with hermetic seal can make a 15°, 30°, 45°, 60°, 75°, 90°, 105°, 120°, 135°, 150°, 165°, 180°, or a similar other angle in relation to a major transverse plane of apparatus 200. Apparatus 200 can test an e-smoking device at various angular settings of the exhaust nozzle of the apparatus relative to a major transverse plane of the apparatus; this can advantageously provide for testing the e-smoking device at different angles of exit of the plurality of puffs through the exhaust nozzle. Apparatus 200 can thus test an e-smoking device at various aerosolization angles.

Figure 9:
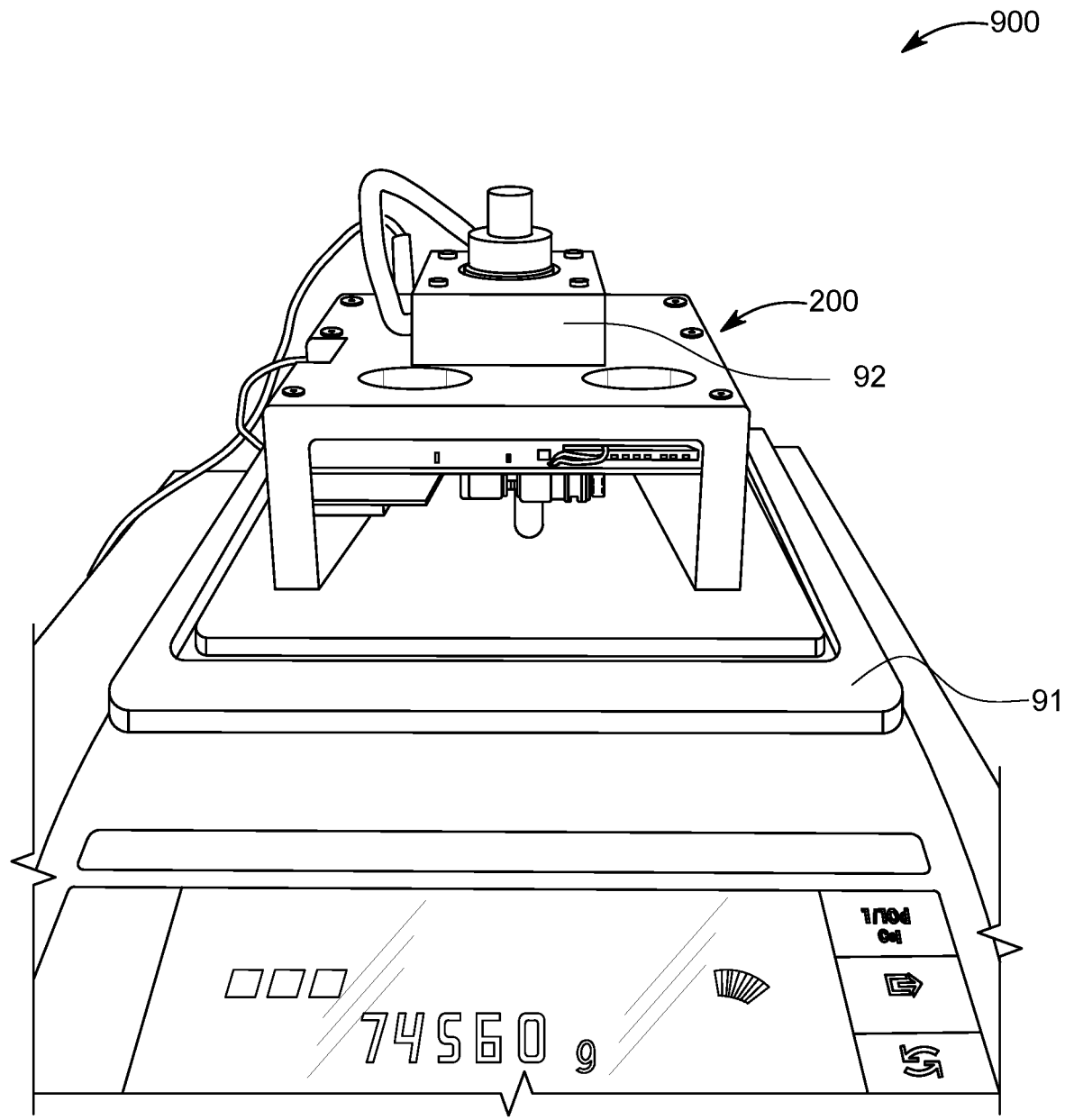
FIG. 9 is a schematic representation illustrating side perspective view of an e-cigarette testing apparatus, according to one or more embodiments of the presently disclosed subject matter.

In one embodiment, the wick rate measurement is accomplished by first attaching an e-cigarette device or e-smoking device to e-cigarette mount 92 of apparatus 200. The wireless controller of apparatus 200 is configured for automatically connecting to a Wi-Fi connection. This results in assembly 900 (as illustrated in FIG. 9). Assembly 900 is then placed onto precision scale 91. This configuration (i.e., the assembly placed onto precision scale 90) is placed inside an aquarium to minimize environmental effects from disturbing the readings in one embodiment. A personal computer (PC) with customized software that is in electronic communication with the wireless controller is configured for displaying real time data capture as well as test duration data storage. Additionally, communication to the e-cigarette actuator to initiate a test is controlled by an additional application operating on the PC, with this additional application in electronic communication with the wireless controller via a wireless connection such as a Wi-Fi connection. The PC software can read the weight measurement from the scale via a USB or Wi-Fi interface. The e-cigarette controller controls the operation of the device under test via a Wi-Fi interface. The e-cigarette controller can control the actuation of the e-cigarette; specifically, the e-cigarette controller can further control actuation time, wattage, air flow and data capture. Connected to the e-cigarette controller are five or more thermocouples such as, for example, wick thermocouple, coil thermocouple, ambient temperature thermocouple, and air flow thermocouple, and ambient temperature thermocouple.

Figure 10A:
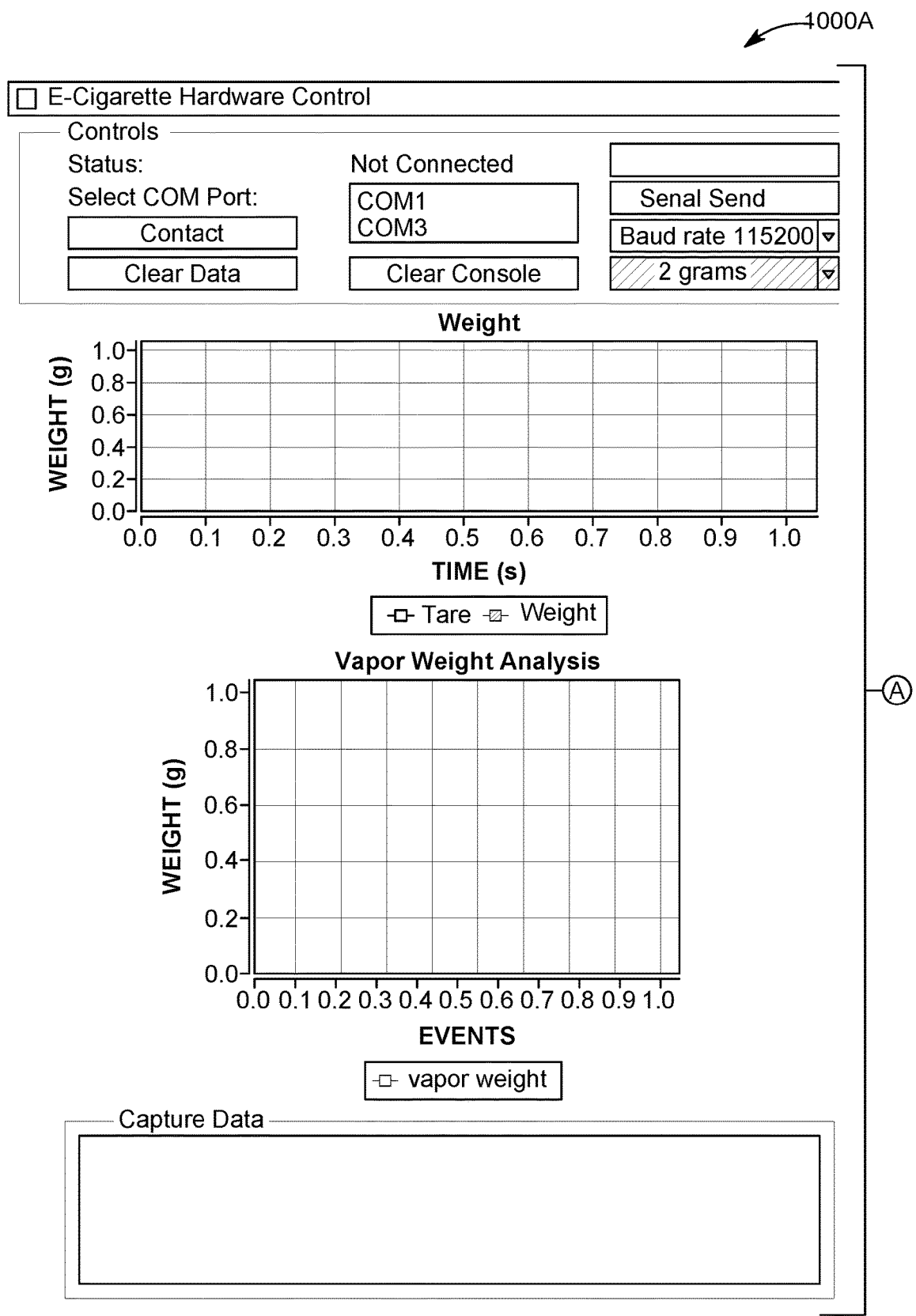
FIGS. 10A, 10B and 10C are schematic representations illustrating screen shots of an application associated with an e-cigarette testing apparatus, according to one or more embodiments of the presently disclosed subject matter.
Figure 10B:
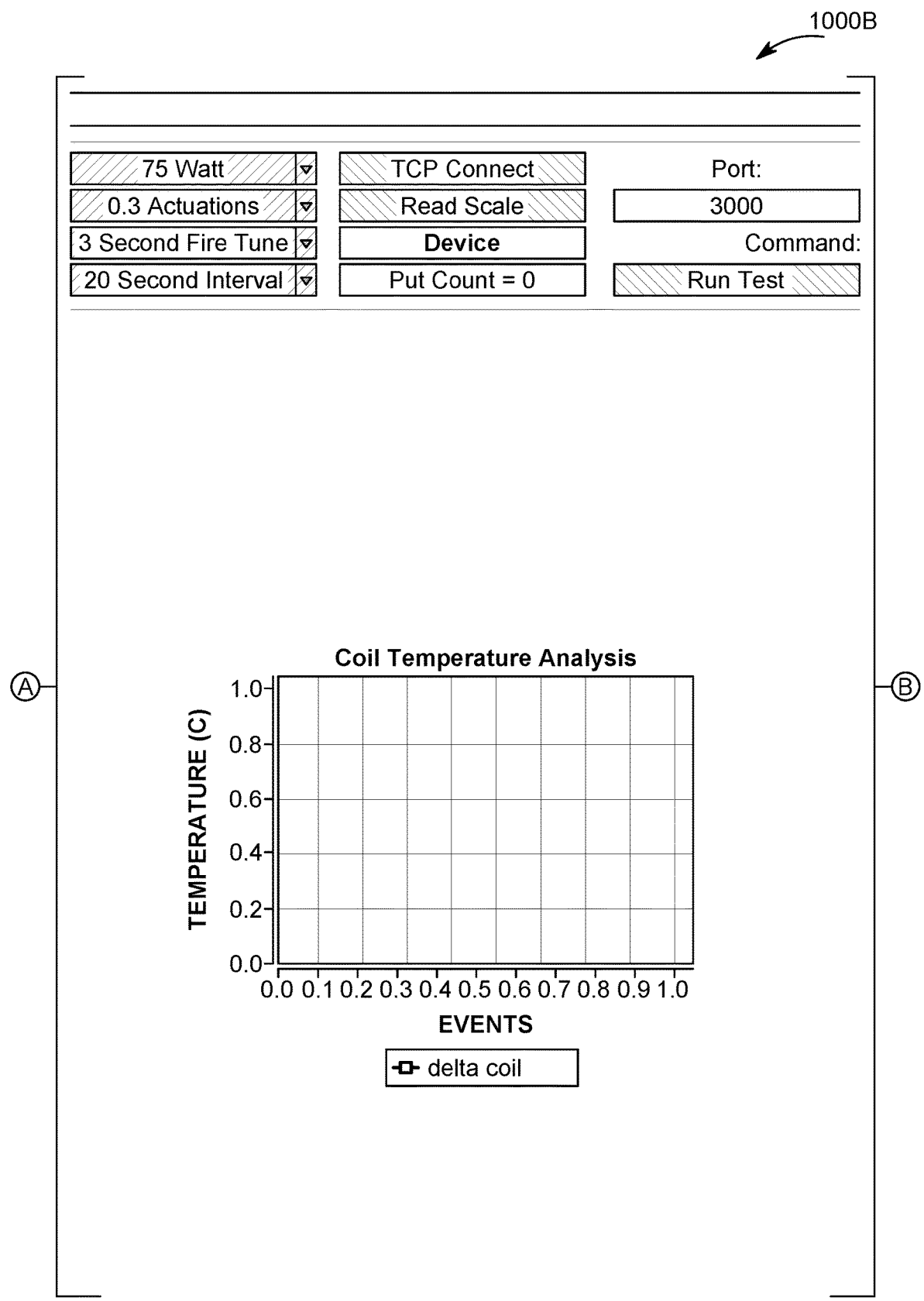
Figure 10C:
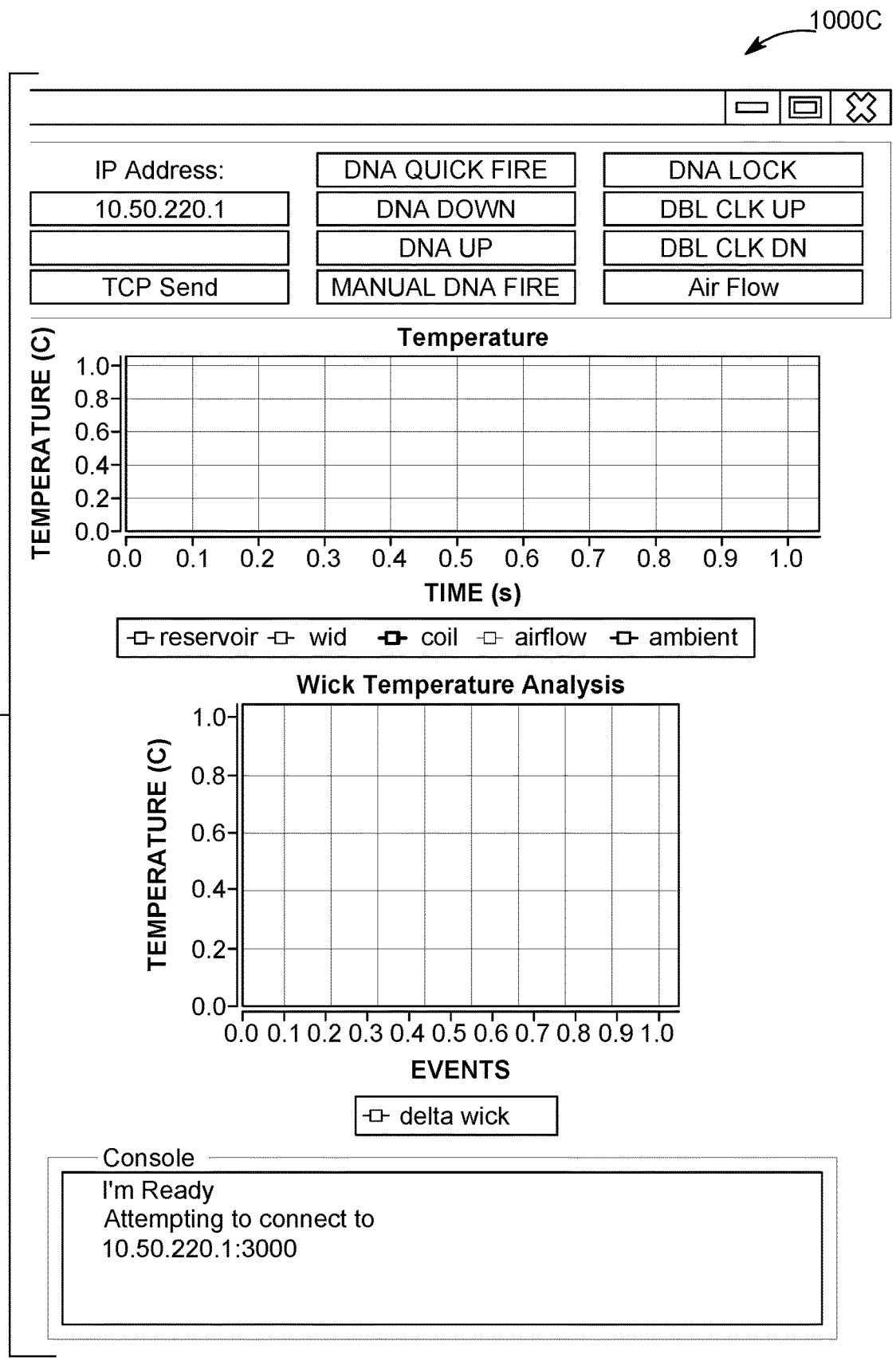

In various embodiments, an application running on a PC connects through Wi-Fi to the e-cigarette controller. The application also connects to the scale via USB or Wi-Fi. Using the e-cigarette controller test sequences can be initiated, and data recorded. An initial set-up sequence configures a DNA250 controller internal to the e-cigarette controller with the desired wattage, coil material and coil temperature. In one embodiment, the pump has a capacity of 2.5 L/min. However, the pump capacity can be higher or lower. The pump is configured to push air through the e-cigarette device. The pump is further auto triggered based of the firing and extends for a definable number of seconds after the firing ends to ensure that the entire vapor is exhausted out of cartridge 19. Data is captured based on a user configurable time value. In one embodiment, the time value is every 200 milliseconds, and the data is recorded in a CSV file for later analysis. The data while being captured can simultaneously also be displayed on several graphs in real time. A sampling of the type graphs can show an initial weight versus a current weight; another graph can show the five temperatures. Another graph may show the change in weight per puff. FIGS. 10A, 10B and 10C respectively illustrate screen shot 1000A, screen shot 1000B and screen shot 1000C associated with the application that operates in conjunction with, or is otherwise in communication with, apparatus 200. FIG. 11 shows a snapshot 1100 of a data display associated with apparatus 200. The snapshot 1100 is a CSV data that includes configuration information for later reference. However, it should be noted that FIG. 10 and FIG. 11 merely represent some simplified examples; in other words, the application can be able to generate, track, store and plot more complex inputs and outputs.

In one embodiment, the thermocouples measuring the coil, wick and liquid temperatures represent quick disconnect K-type thermocouples that are fed up via the e-cigarette air inlet. In another embodiment, the thermocouples measuring the coil, wick and liquid temperatures are fine wire K-type and are fed up via the e-cigarette air outlet or some other suitable opening. The equipment list for conducting the test under one embodiment is provided in Table 1. It should be noted that Table 1 illustrates only one example, and several other configurations are contemplated by the invention, as would be appreciated by a person of skill in the art. Indeed, the apparatus can be operated with less components or more components compared to what is listed in Table 1.

TABLE 1

| Device | Description | Part Number |
|---|---|---|
| Aquarium | 13" × 23" × 16.5" Acrylic Aquarium [or equivalent to minimize air disturbance around cartridge 19 [optional depending on testing arrangement] | |
| Scale | Mettler Toledo Analytical Balance | PG5002-S DeltaRange [Typical] |
| E-Cigarette Controller | RTI Custom Controller | |
| PC | Windows 7/Windows 10 | |
| Thermocouple | Quick Disconnect Thermocouples, K-Type | SCAXL-020L-6 |

As a normal course of lab measurements, certain consumables associated with liquid material handling (gloves, solvents etc.) may be required, but not specifically identified. The information in Table 2 identifies what is required for each unit tested. The thermal couples may be reusable, but due to fragility will have a relatively short life span.

TABLE 2

| Device | Description | Part Number |
|---|---|---|
| Thermal Couple | Fine Wire Type K Thermal Couple 40awg, 1M | 5TC-TT-K-40-36 |

The equipment set-up location is ideally positioned near an exhaust hood. The exhaust hood may need to be adjusted to insure the e-cigarette plum is drawn away from the device. The steps of the experiment can include the following: (1) screw the E-Cig Cartridge onto the Wi-Fi e-cigarette (E-Cig) controller; (2) attach top cap with 4 screws; (3) attach thermal couples (or thermocouples) to quick connect plugs of e-cigarette controller; (4) attach thermal couples to the e-cigarette device; (5) pass the thermal couples m down through the mouth piece down to the coil, wick, and reservoir; and, (6) tighten top cap screws. The apparatus in general, and the e-cigarette device in particular, is now ready to use.

Figure 12:
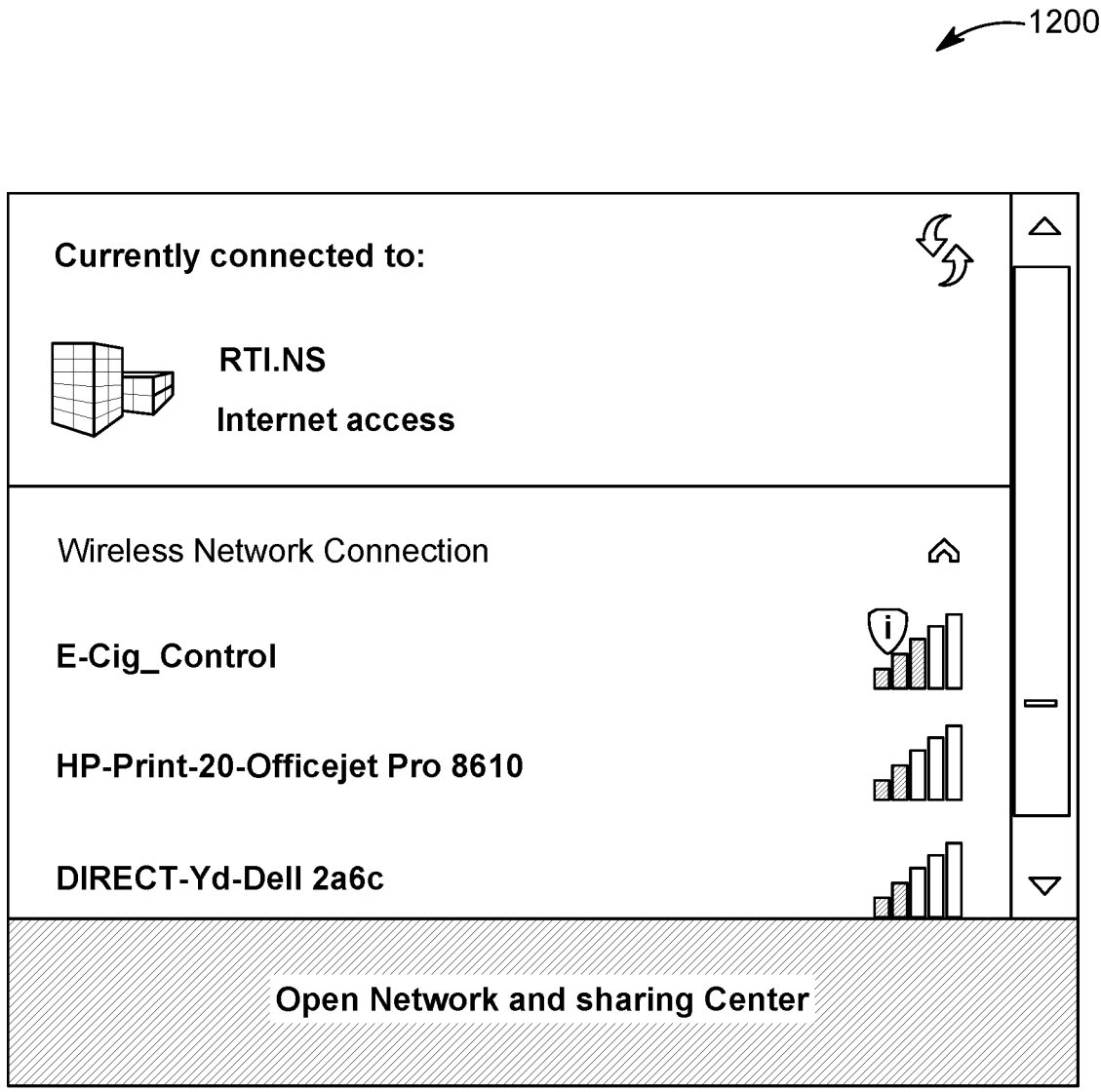
FIG. 12 is a schematic representation illustrating a network and sharing center display provided on an electronic device, according to one or more embodiments of the presently disclosed subject matter.

The next steps of the experiment can include the following: (1) connect USB; (2) USB side Switch to front; (3) Start Escribe; (4) Start Device Monitor; (5) Choose desired profile (Click lower right of Device Monitor; Profiles are configured for Wattage and Coil Configuration); (6) Close Escribe; (7) Disconnect USB; (8) Place E-Cig Controller on Scale; (9) Place Air handler over device; (10) Turn on Toggle switch to power the device; (11) Click on Application Icon The subsequent steps of the experiment can include the following: (1) Verify USB cable is connected to the scale— (a) Check Device Manager for correct scale port, (b) Select correct port, (c) Click Connect Button in application, and (d) Read Scale will display weight in scale window [green window; The value is reduced by the E-Cigarette Controller weight to yield a value of the Cartridge with Juice); (2) Connect Computer to E-Cig Control Network Wi-Fi port (FIG. 12 illustrates network and sharing center display 1200 as viewed on an electronic device); Connect Device to computer click TCP connect (Look For "Listening" in Console Window; (3) Check settings of DNA250 by DNA Quick Fire (Check Watts); (4) Click on and select Wattage configuration; (5) Click on and select Fire Time; (6) Type >C in Command Window; (7) Click TCP Send (Pump will run for about 10-15 seconds). The apparatus in general, and the e-cigarette device in particular, is now ready to run tests.

Figure 13:
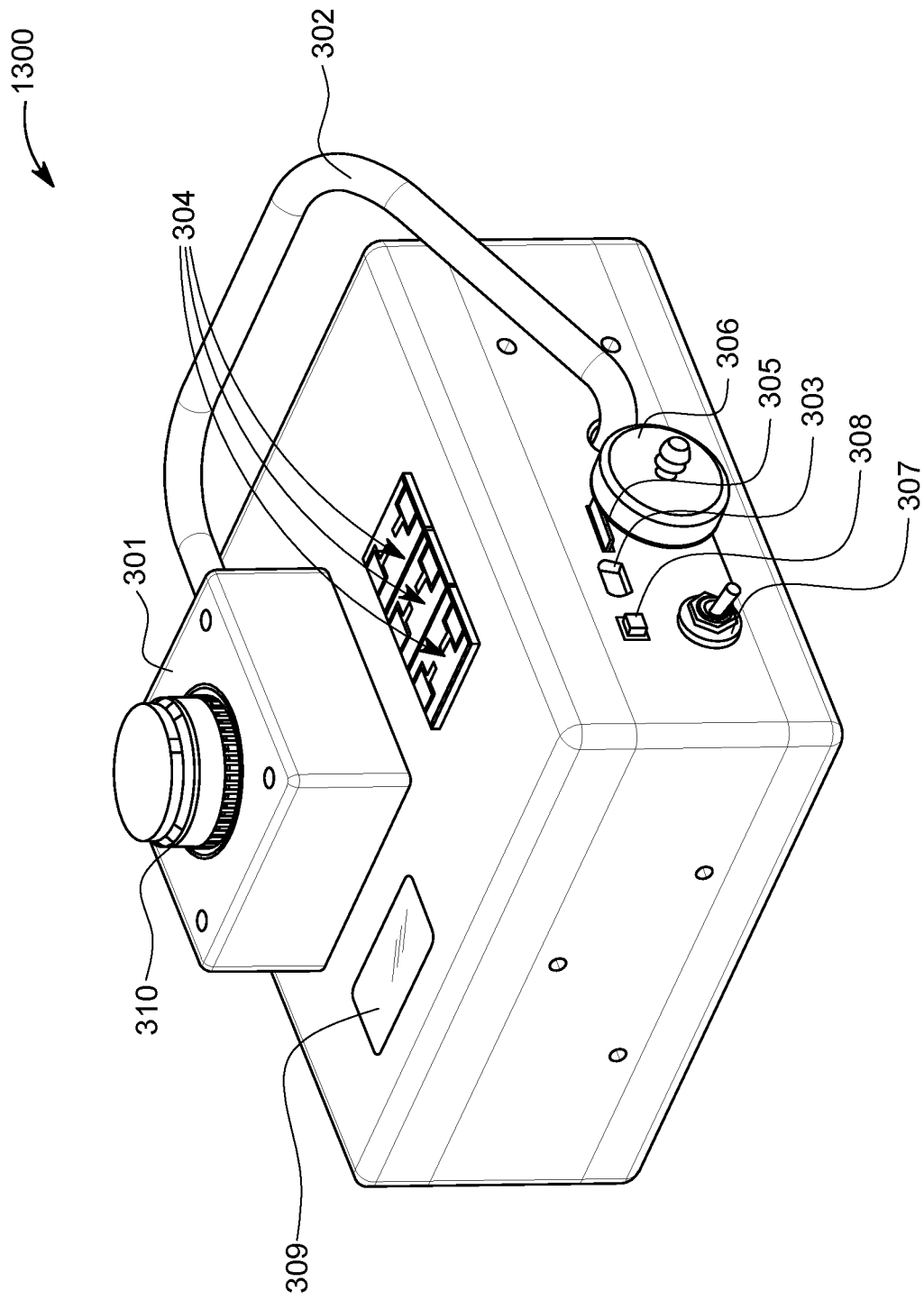
FIGS. 13, 14 and 15 are schematic representations illustrating side perspective views of various components of an e-cigarette testing apparatus, according to one or more embodiments of the presently disclosed subject matter.
Figure 14:
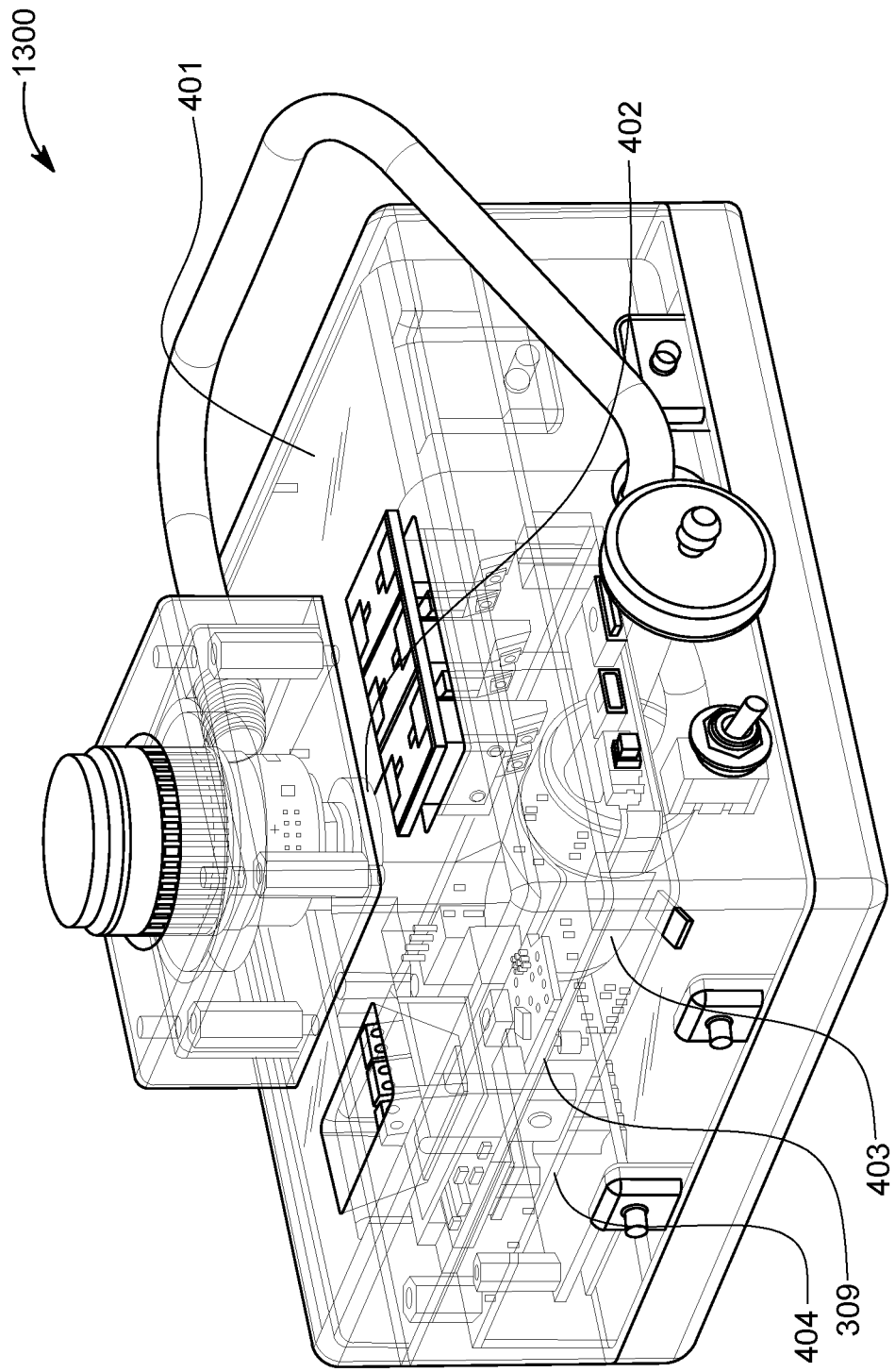
Figure 15:
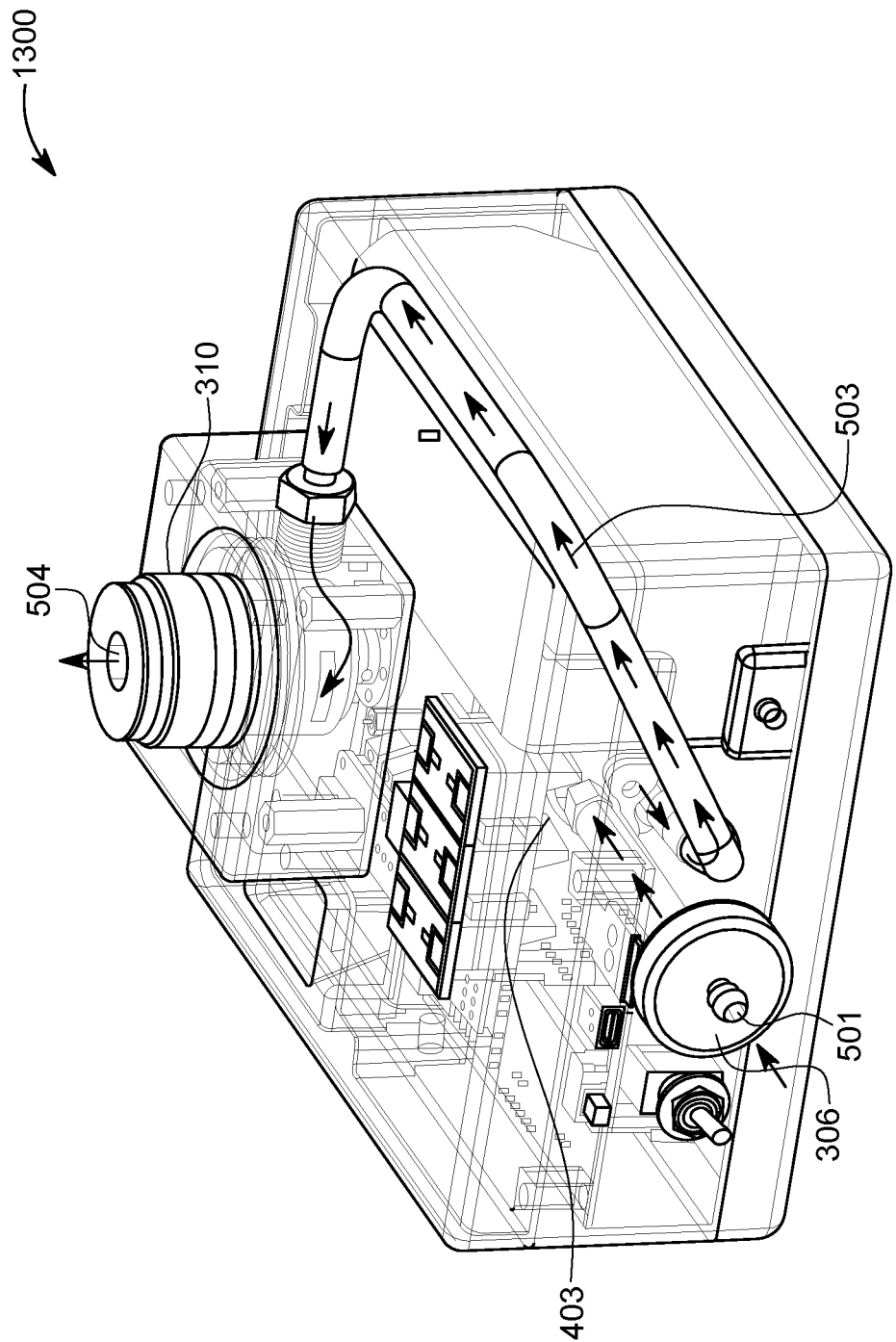

The steps for running the tests can include the following: (1) Start Data Capture with Run Test; and, (2) The configured test will run with real time data display FIGS. 13, 14 and 15 are schematic representations illustrating side perspective views of various components of an e-cigarette testing apparatus, according to one or more embodiments of the presently disclosed subject matter. FIG. 13 illustrates an apparatus 1300 according to at least one embodiment. As illustrated in FIG. 13, apparatus 1300 includes an air cap 301, an air flow tubing 302, on or more USB ports 303, thermocouple interfaces 304, on or more SD card slots 305, an inlet air filter 306, an on/off switch 307, a USB selector switch 308, a DNA250 display 309, and an e-cigarette mount 310, in addition to other components. As illustrated in a "see-through" version of apparatus 1300 shown in FIG. 14, apparatus 1300 further includes a control circuit 404, a pump 403, a Cisco 510 connector 402, and a battery pack 401. Further, as illustrated in a "see-through" version of apparatus 1300 shown in FIG. 15, apparatus 1300 further includes air inlet 501, inlet air filter 502, air flow conduit 503, and vapor outlet 504.

Figure 16:
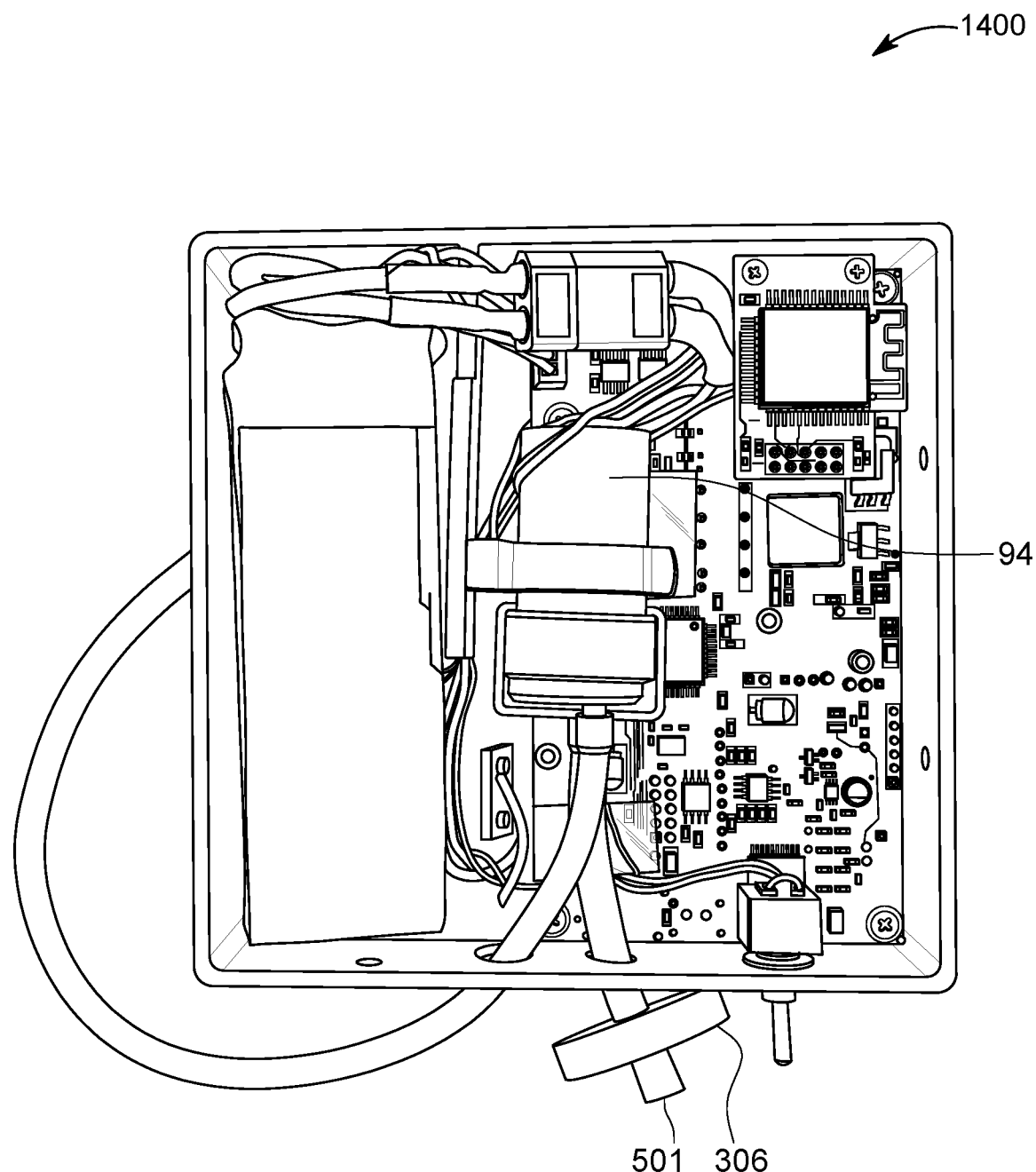
FIG. 16 is a schematic representation illustrating a bottom perspective view of an e-cigarette testing apparatus with its bottom cover removed, according to one or more embodiments of the presently disclosed subject matter.
Figure 17:
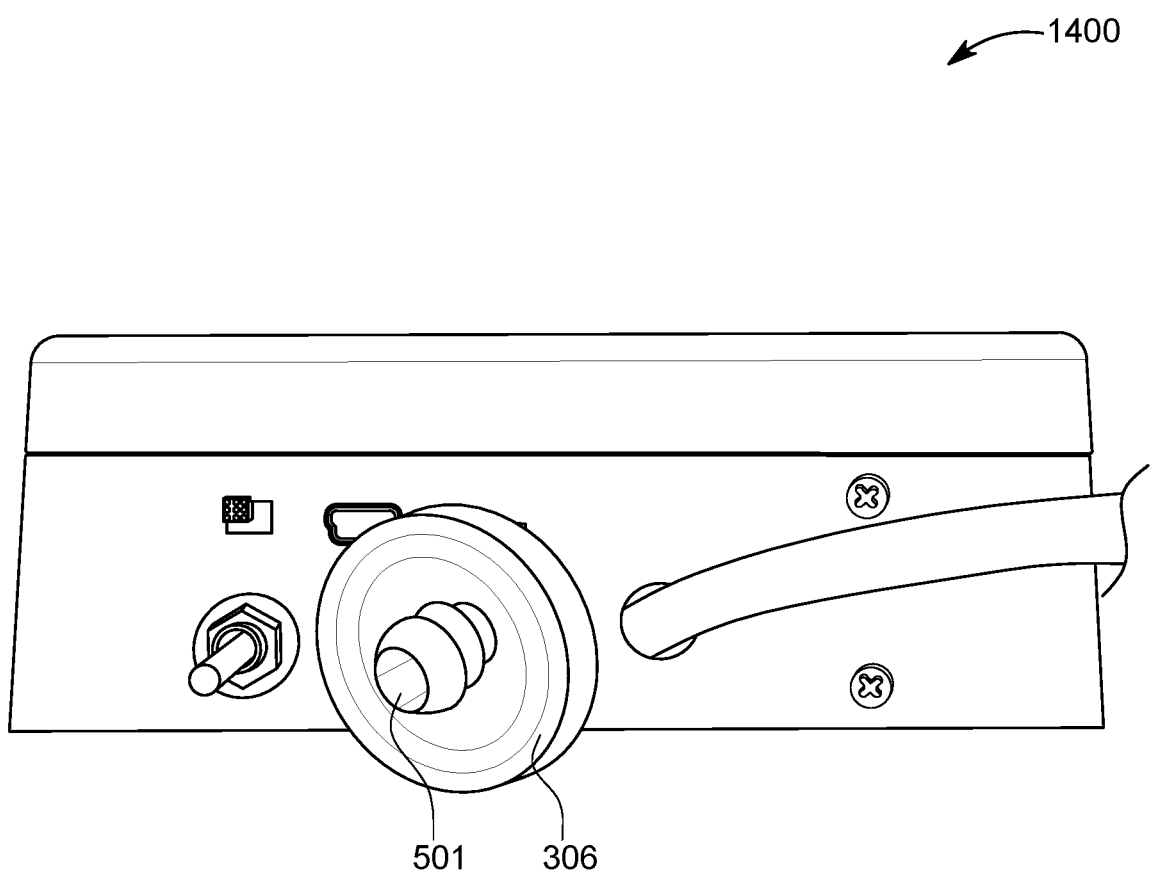
FIG. 17 is a schematic representation illustrating a side perspective view of an e-cigarette testing apparatus, according to one or more embodiments of the presently disclosed subject matter.

FIGS. 16 and 17 illustrate additional embodiments associated with the presently disclosed subject matter. As shown in FIG. 16, apparatus 1400 includes pump 94, air inlet 501, and inlet air filter 306. FIG. 17 illustrates a side view of apparatus 1400 of FIG. 16.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for testing an electronic smoking (e-smoking) device, the apparatus comprising:
   an electronic circuit for electronically activating an e-smoking device and causing the e-smoking device to generate a plurality of puffs by converting a wicking fluid therein into the plurality of puffs without a need for a human to physically contact the e-smoking device during puff generation;
   a wireless controller for controlling the electronic circuit;
   wherein the electronic circuit is configured for activating the e-smoking device and causing the e-smoking device to generate the plurality of puffs based on wireless signals received at the wireless controller; and
   wherein the apparatus is configured for measuring a characteristic of the e-smoking device.

2. The apparatus of claim 1, wherein the characteristic is a rate of conversion of the wicking fluid to vapor as a function of time for the plurality of puffs.

3. The apparatus of claim 1, wherein the electronic circuit is configured for activating different functions of the e-smoking device based on signals received at the wireless controller.

4. The apparatus of claim 3, wherein the different functions comprise one or more of: a power adjustment, a puff generation period, setting a time interval between puff generations, and setting a predetermined number of puff generations.

5. The apparatus of claim 1, wherein the characteristic is an output from the e-smoking device, and wherein the characteristic is used to modify an input supplied to the e-smoking device.

6. The apparatus of claim 1, wherein the characteristic is associated with one or more of: an input supplied to the e-smoking device, and an output from the e-smoking device.

7. The apparatus of claim 1, wherein the apparatus further comprises two or more angular settings of an exhaust nozzle of the apparatus relative to a major transverse plane of the apparatus for testing the e-smoking device at different angles of exit of the plurality of puffs through the exhaust nozzle.

8. The apparatus of claim 1, wherein the apparatus further comprises a power connector positioned at a top surface of a housing of the apparatus for receiving an e-cigarette cartridge of the e-smoking device, wherein the cartridge comprises an air inlet side, a reservoir, and an outlet.

9. The apparatus of claim 8, wherein the apparatus further comprises a top cap positioned on the top surface of the housing of the apparatus for sealing against the e-cigarette cartridge of the e-smoking device, the top cap forming an airtight seal with the e-cigarette cartridge above the air inlet of the e-smoking device.

10. The apparatus of claim 1, wherein the apparatus further comprises at least one thermocouple for measuring a wick temperature or a coil temperature.

11. The apparatus of claim 1, wherein the apparatus further comprises at least five thermocouples, wherein a first thermocouple is configured for measuring a reservoir temperature, a second thermocouple is configured for measuring a wick temperature, a third thermocouple is configured for measuring a coil temperature, a fourth thermocouple is configured for measuring an ambient temperature, and a fifth thermocouple is configured for measuring an air stream flow temperature.

12. The apparatus of claim 11, wherein at least one of the first thermocouple, the second thermocouple and the third thermocouple includes a quick disconnect mechanism.

13. The apparatus of claim 1, further comprising one or more of: a control board enclosed within a housing of the apparatus; at least one display screen positioned at a top surface of the housing of the apparatus; an outlet or exhaust nozzle for exhausting the vapor; a scale for measuring a change in mass corresponding the conversion of the wicking fluid to vapor; and, the electronic circuit enclosed within the housing of the apparatus.

14. The apparatus of claim 1, wherein the apparatus is further configured for collecting temperature data associated with the plurality of puffs for display on a graphical user interface (GUI) of a computing device.

15. The apparatus of claim 1, wherein the apparatus further comprises at least one sensor for performing one or more of: detecting presence of a compound or a material in the plurality of puffs; and, measuring a quantity of the compound or the material present in the plurality of puffs.

16. The apparatus of claim 1, wherein the electronic circuit is configured to one or more of: communicate data associated with conversion of the wicking fluid to vapor to the wireless controller; include a feedback loop to modify a testing sequence of the e-smoking device in real time based on data captured at the apparatus.

17. The apparatus of claim 1, further comprising an opening on an outer surface of a housing of the apparatus for supplying air to an air inlet of the e-smoking device to facilitate conversion of the wicking fluid to vapor, wherein the opening includes a filter.

18. The apparatus of claim 1, wherein the apparatus comprises a pump for pushing air through the e-smoking device to generate the plurality of puffs, wherein the apparatus further comprises controls for setting and adjusting a flow rate of the pump.

19. A method of testing an electronic smoking (e-smoking) device, the method comprising:
   providing an apparatus, the apparatus comprising:
      an electronic circuit for electronically activating an e-smoking device and causing the e-smoking device to generate a plurality of puffs by converting a wicking fluid therein into the plurality of puffs without a need for a human to physically contact the e-smoking device during puff generation, and
      a wireless controller for controlling the electronic circuit;
   receiving, at the wireless controller of the apparatus, a wireless signal;
   activating, by the apparatus, an e-smoking device to generate the plurality of puffs in response to the received wireless signal; and
   measuring, by the apparatus, a characteristic of the e-smoking device.

20. The method of claim 19, further comprising one or more of: activating different functions of the e-smoking device based on signals received at the wireless controller; measuring a wick temperature or a coil temperature at a thermocouple of the apparatus; measuring a change in mass associated with conversion of the wicking fluid to vapor at a scale coupled to the apparatus; collecting temperature data associated with the plurality of puffs; displaying the collected data on a graphical user interface (GUI) of a computing device; communicating data associated with conversion of the wicking fluid to vapor to the wireless controller; setting and adjusting a flow rate of a pump configured for pushing air through the e-smoking device for generating a plurality of puffs; and, modifying a testing sequence of the e-smoking device in real time based on data captured at the apparatus.

\* \* \* \* \*